United States Patent
Zhao et al.

(10) Patent No.: US 9,495,647 B2
(45) Date of Patent: Nov. 15, 2016

(54) ACCELERATION OF SPARSE SUPPORT VECTOR MACHINE TRAINING THROUGH SAFE FEATURE SCREENING

(71) Applicant: SAS Institute Inc., Cary, NC (US)

(72) Inventors: Zheng Zhao, Cary, NC (US); Jun Liu, Cary, NC (US); James Allen Cox, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/834,365

(22) Filed: Aug. 24, 2015

(65) Prior Publication Data
US 2016/0247089 A1    Aug. 25, 2016

Related U.S. Application Data

(60) Provisional application No. 62/119,974, filed on Feb. 24, 2015, provisional application No. 62/137,768, filed on Mar. 24, 2015.

(51) Int. Cl.
G06F 15/18 (2006.01)
G06N 99/00 (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| | | | | |
|---|---|---|---|---|
| 2003/0093393 A1* | 5/2003 | Mangasarian | ....... | G06K 9/6269 706/16 |
| 2008/0233576 A1* | 9/2008 | Weston | ................ | C12Q 1/6883 706/12 |
| 2009/0150309 A1* | 6/2009 | Chapelle | .............. | G06K 9/6269 706/12 |
| 2011/0231348 A1* | 9/2011 | Xiao | .................... | G06K 9/6268 706/12 |
| 2011/0251984 A1* | 10/2011 | Nie | ................... | G06F 17/30731 706/18 |
| 2015/0006443 A1* | 1/2015 | Rose | ................... | G06N 99/005 706/12 |

OTHER PUBLICATIONS

Zhao et al., "Safe and Efficient Screening for Sparse Support Vector Machine" SAS Institute Inc. 600 Research Drive, Cary, NC 27513, KDD New York (Aug. 24-27, 2014) ACM 978-1-4503-2956-9/14/08; 10 pages.

Zhao et al., "Using Hemisphere Constraints to Identify Inactive Features for Accelerating Sparse Support Vector Machine Training in Model Selection" SAS Institute Inc. 600 Research Drive, Cary, NC 27513, KDD New York (Aug. 24-27, 2014) 10 pages.

(Continued)

*Primary Examiner* — Luis Sitiriche
(74) *Attorney, Agent, or Firm* — Kilpatrick Townsend & Stockton LLP

(57) ABSTRACT

A system for machine training can comprise one or more data processors and a non-transitory computer-readable storage medium containing instructions which, when executed on the one or more data processors, cause the one or more data processors to perform operations including: accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

18 Claims, 15 Drawing Sheets

(56) References Cited

OTHER PUBLICATIONS

Wang et al., "Scaling SVM and Least Absolute Deviations via Exact Data Reduction" Computer Science and Engineering, Arizona State University, USA (Oct. 29, 2013) 21 pages.
Tan et al., "Learning sparse SVM for feature selection on very high dimensional dataset" Proceedings of the 27th International Conference on Machine Learning, Haifa, Israel (2010), 8 pages.
Bi et al., "Dimensionality reduction via sparse support vector machines" Journal of Machine Learning Research 3 (2003) 1229-1243.
Boyd et al,. "Convex Optimization" Cambridge University Press, (2004) 10 pages.
Bradley et al., "Feature selection via concave minimization and support vector machines". International Conference on Machine Learning (1998) 9 pages.
Candes et al., "An introduction to compressive sampling" IEEE Signal Processing Magazine, 25:21-30, (2008) 10 pages.
Fan et al., "Liblinear: A library for large linear classification". Journal of Machine Learning Research 9 (2008) 1871-1874.
Ghaoui et al., "Safe feature elimination in sparse supervised learning" Pacific Journal of Optimization, 8:667-698, (2012).
Guyon et al., "Gene selection for cancer classification using support vector machines" Machine Learning, 46:389-422, (2002).
Lions and al., "Variational Inequalities" Communications on Pure and Applied Mathematics, 20, (3):493-519, (1967).
Liu et al., "Safe screening with variational inequalities and its application to lasso" Proceedings of the 31st International Conference on Machine Learning, (2014) 9 pages.
Tibshirani "Regression shrinkage and selection via the lasso" Journal of the Royal Statistical Society, Series B, 58:267-288, (1996).
Tibshirani et al., "Strong rules for discarding predictors in lasso-type problems". Journal of the Royal Statistical Society: Series B, 74:245-266, (2012).
Tseng et al., "A coordinate gradient descent method for nonsmooth separable minimization" Mathematical Programming, 117:387-423, (2009).
Wang et al., "Lasso screening rules via dual polytope projection" NIPS Proceedings (2013) 9 pages.
Weston et al., "Use of the zero norm with linear models and kernel methods" Journal of Machine Learning Research 3 (2003) 1439-1461.
Yuan et al., "Scalable training of sparse linear SVMs" IEEE 12th International Conference on Data Mining (2012) 10 pages.
Xiang et al., "Learning sparse representations of high dimensional data on large scale dictionaries" NIPS Proceedings (2011) 9 pages.
Zhu et al., "1-norm support vector machines" NIPS Proceedings, (2003) 8 pages.

* cited by examiner

1100

```
┌─────────────────────────────────────────────────────────┐
│   ACCESS DATASET CONTAINING DATA TRACKING A PLURALITY   │
│                     OF FEATURES                          │
│                        1102                              │
└─────────────────────────────────────────────────────────┘
                            ▼
┌─────────────────────────────────────────────────────────┐
│     DETERMINE VALUES FOR THE REGULARIZATION PARAMETER   │
│              ( λ₁ > λ₂ > ... > λₚ )                     │
│                        1104                              │
└─────────────────────────────────────────────────────────┘
                            ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
│   DETERMINE AN INITIAL REGULARIZATION VALUE (λₖ) HAVING │
│              FEWEST NUMBER OF FEATURES                   │
│                        1106                              │
└ ─ ─ ─ ─ ─ ─ ─ ─ ─ ─ ─ ─ ─ ─ ─ ─ ─ ─ ─ ─ ─ ─ ─ ─ ─ ─ ─ ┘
                            ▼
┌─────────────────────────────────────────────────────────┐
│   CALCULATE AN INITIAL SOLUTION (E.G., (wₖθₖ)) TO THE   │
│    SPARSE SUPPORT VECTOR MACHINE MODEL FOR THE INITIAL  │
│                 REGULARIZATION VALUE (λₖ)                │
│                        1108                              │
└─────────────────────────────────────────────────────────┘
                            ▼
┌─────────────────────────────────────────────────────────┐
│  USE THE INITIAL SOLUTION (E.G., (wₖθₖ)) TO IDENTIFY     │
│  INACTIVE FEATURES OF THE SPARSE SUPPORT VECTOR MACHINE  │
│  MODEL FOR THE NEXT REGULARIZATION VALUE (λₖ₊₁)          │
│                        1110                              │
└─────────────────────────────────────────────────────────┘
                            ▼
┌─────────────────────────────────────────────────────────┐
│  CALCULATE A NEXT SOLUTION (E.G., (wₖ₊₁θₖ₊₁)) USING ONLY │
│          FEATURES NOT IDENTIFIED AS INACTIVE             │
│                        1112                              │
└─────────────────────────────────────────────────────────┘
```

Determine values for the regularization parameter ($\lambda_1 > \lambda_2 > ... > \lambda_p$) 1104

Determine an initial regularization value ($\lambda_K$) having fewest number of features 1106

Calculate an initial solution (e.g., ($w_K \theta_K$)) to the sparse support vector machine model for the initial regularization value ($\lambda_K$) 1108

Use the initial solution (e.g., ($w_k \theta_k$)) to identify inactive features of the sparse support vector machine model for the next regularization value ($\lambda_{k+1}$) 1110

Calculate a next solution (e.g., ($w_{k+1} \theta_{k+1}$)) using only features not identified as inactive 1112

DETERMINE AN UPPER BOUND FOR $|f_j^\top \theta_{k+1}^*|$ (E.G. AN INNER PRODUCT OF A WEIGHTED FEATURE AND THE DUAL VARIABLE FOR THE NEXT REGULARIZATION VALUE)
1202

IS THE UPPER BOUND > 1?
1204

YES → THE WEIGHTED FEATURE IS INACTIVE
1206

NO → THE WEIGHTED FEATURE IS NOT INACTIVE
1208

1300

```
DETERMINE AN INITIAL DUAL VARIABLE (E.G., θₖ) FOR THE
INITIAL REGULARIZATION VALUE (E.G., λₖ) USING THE INITIAL
SOLUTION (E.G., (wₖ,θₖ))
1302
              │
              ▼
CONSTRAIN THE DUAL VARIABLE (E.G., θₖ₊₁) FOR THE NEXT
REGULARIZATION VALUE (E.G., λₖ₊₁) TO A CONVEX SET (E.G., K)
USING THE INITIAL DUAL VARIABLE (E.G., θₖ)
1304
              │
              ▼
DETERMINE THE UPPER BOUND BY CALCULATING A MAXIMUM
VALUE OF THE CONVEX SET (E.G., K)
1306
```

ACCELERATION OF SPARSE SUPPORT VECTOR MACHINE TRAINING THROUGH SAFE FEATURE SCREENING

CROSS REFERENCE TO RELATED APPLICATIONS

The present application is a non-provisional of and claims the benefit of U.S. Provisional Patent Application No. 62/119,974, entitled "USING HEMISPHERE CONSTRAINTS TO IDENTIFY INACTIVE FEATURES FOR ACCELERATING SPARSE SUPPORT VECTOR MACHINE TRAINING IN MODEL SELECTION," filed on Feb. 24, 2015, and U.S. Provisional Patent Application No. 62/137,768, entitled "USING HEMISPHERE CONSTRAINTS TO IDENTIFY INACTIVE FEATURES FOR ACCELERATING SPARSE SUPPORT VECTOR MACHINE TRAINING IN MODEL SELECTION," filed on Mar. 24, 2015, which are hereby incorporated by reference in their entirety.

TECHNICAL FIELD

The present disclosure relates to improving machine learning generally and more specifically to sparse support vector machine training.

BACKGROUND

Sparse support vector machine (SPSVM) is a robust predictive model that can effectively remove noise and preserve signals. SPSVM has been successfully applied in a variety of data mining applications, including text mining, bioinformatics, and image processing, for example.

SUMMARY

Certain aspects and feature of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain aspects and features of this disclosure relate to a system for machine training can comprise one or more data processors and a non-transitory computer-readable storage medium containing instructions which, when executed on the one or more data processors, cause the one or more data processors to perform operations including: accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

Certain aspects and features of this disclosure relate to a computer-program product tangibly embodied in a non-transitory machine-readable storage medium, including instructions configured to cause a data processing apparatus to perform operations including: accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

Certain aspects and features of this disclosure relate to a computer-implemented method, comprising accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 11 is a flowchart depicting an example of a process for solving a sparse support vector machine model according to certain aspects of the present disclosure.

Figure 1:
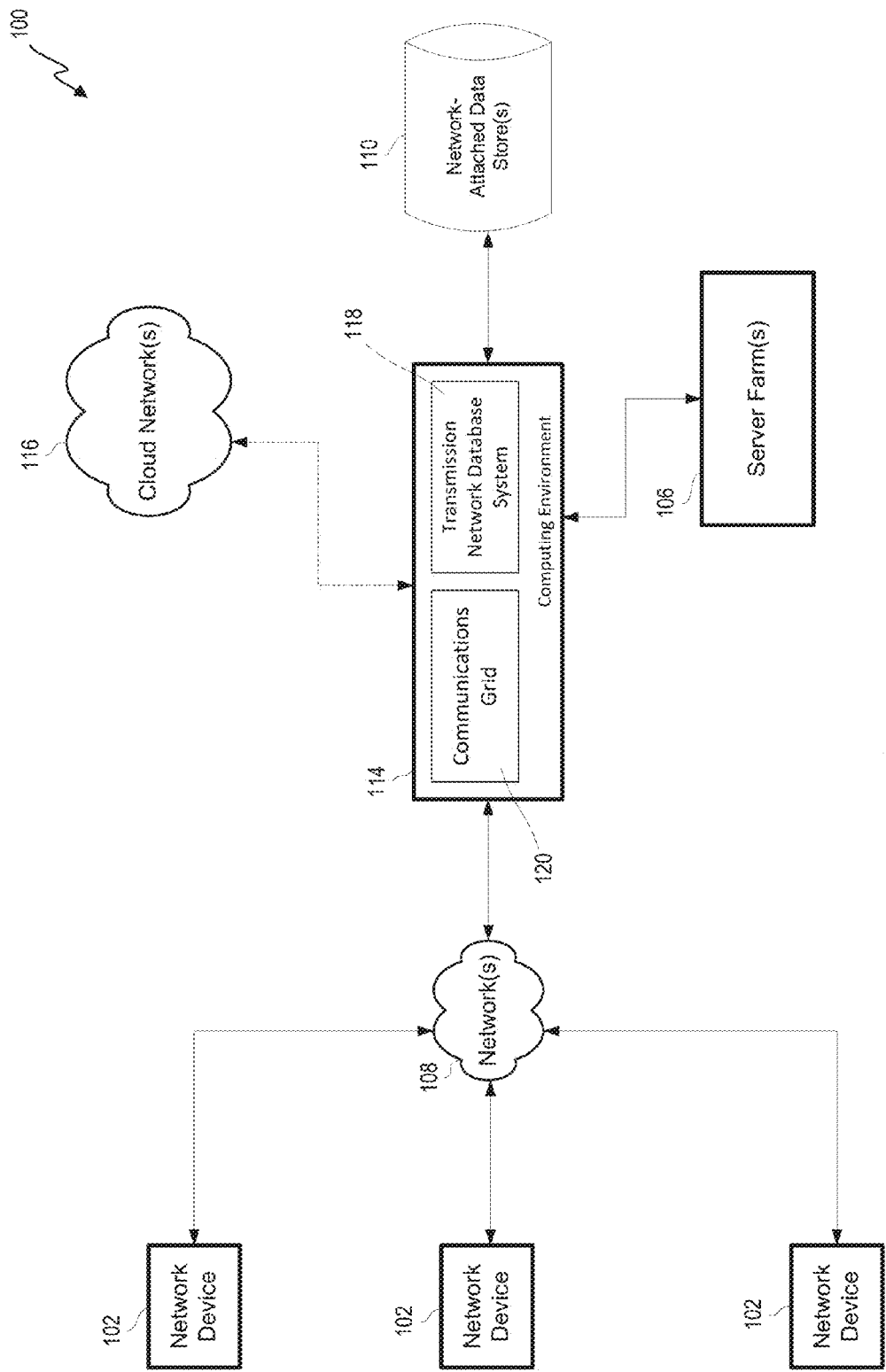
FIG. 1 illustrates a block diagram that provides an illustration of the hardware components of a computing system, according to certain aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label. The elements included in the illustrations herein may not be drawn to scale.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to certain aspects of the present disclosure. Data transmission network 100 is a specialized computer system that may be used for processing large amounts of data where a large number of computer processing cycles are required. For example, the data transmission network 100 can be used to obtain and use solutions to sparse Support Vector Machines (SPSVMs) using the techniques described herein.

Data transmission network 100 may also include computing environment 114. Computing environment 114 may be a specialized computer or other machine that processes the data received within the data transmission network 100. The computing environment 114 can be used to solve SPSVMs. For example, the computing environment 114 can receive a classification request, solve an SPSVM associated with the classification request, and provide a classification response, as described herein. Data transmission network 100 also includes one or more network devices 102. Network devices 102 may include client devices that attempt to communicate with computing environment 114. For example, network devices 102 may send data to the computing environment 114 to be processed (e.g., a classification request or dataset data), may send signals to the computing environment 114 to control different aspects of the computing environment or the data it is processing, among other reasons. Network devices 102 may interact with the computing environment 114 through a number of ways, such as, for example, over one or more networks 108. Network devices 102 may receive data from the computing environment 114 that has been processed (e.g., a classification response). As shown in FIG. 1, computing environment 114 may include one or more other systems. For example, computing environment 114 may include a database system 118 and/or a communications grid 120.

Figure 8:
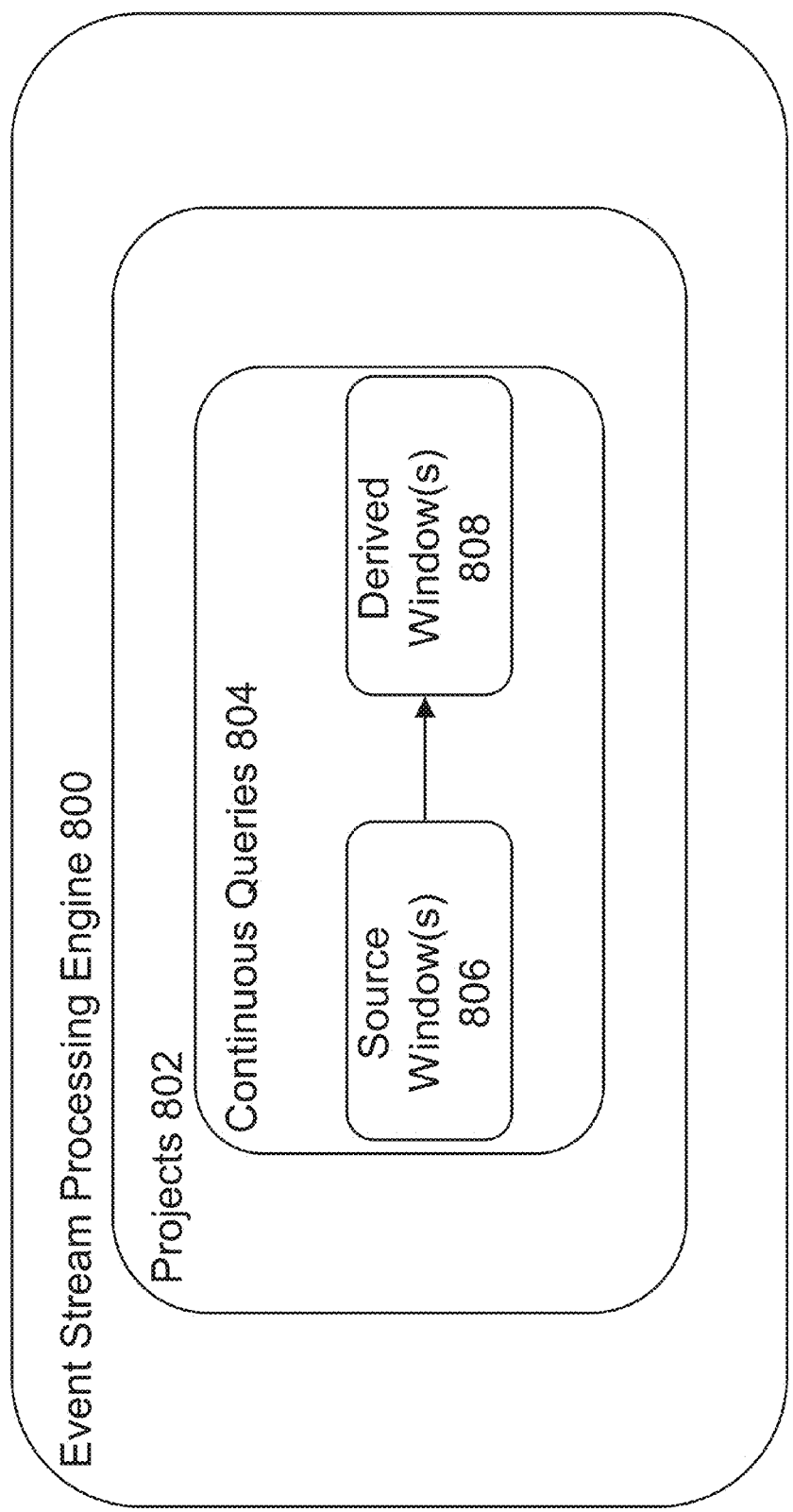
FIG. 8 illustrates a block diagram including components of an Event Stream Processing Engine (ESPE), according to certain aspects of the present disclosure.
Figure 9:
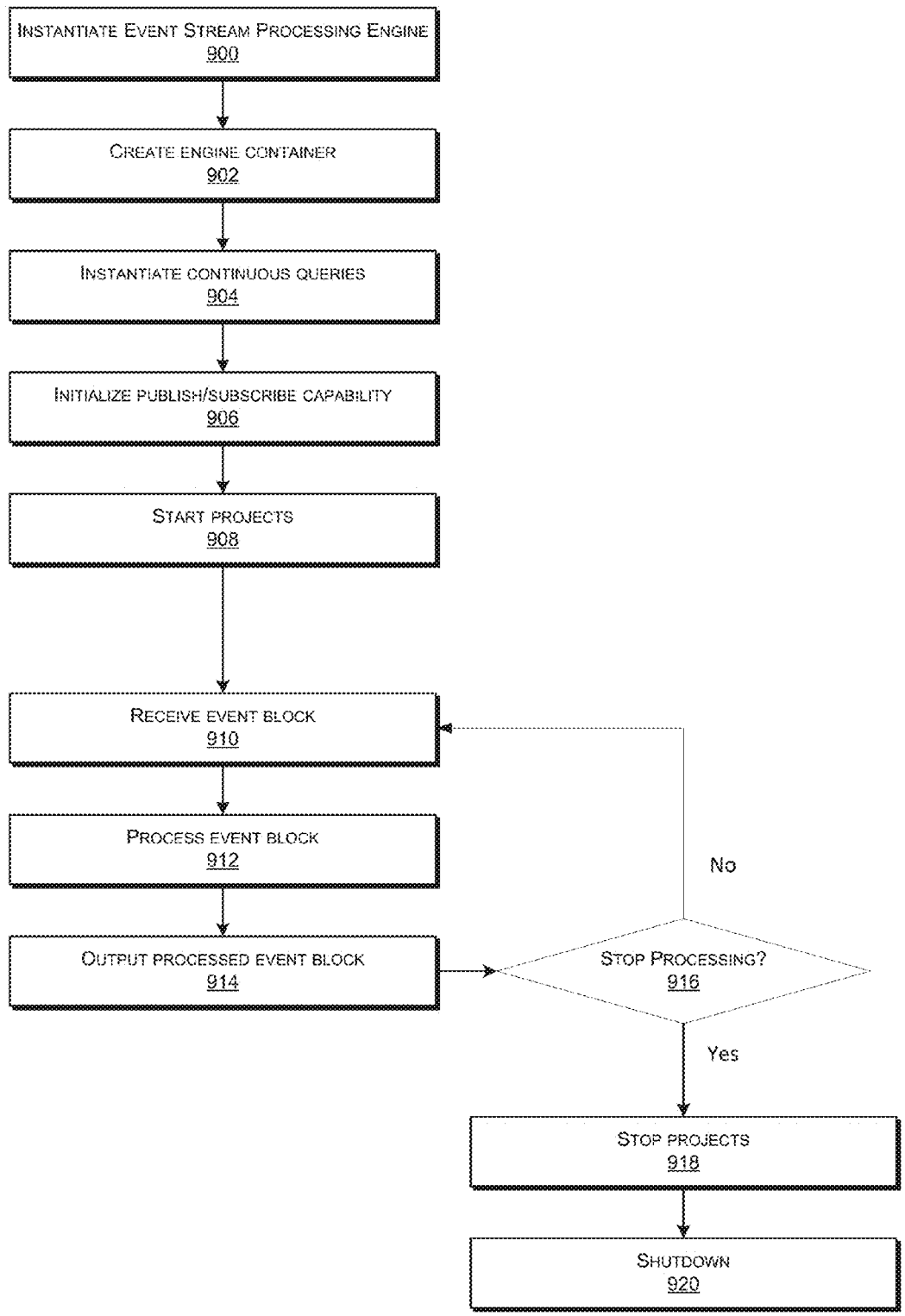
FIG. 9 illustrates a flow chart showing an example process including operations performed by an event stream processing engine, according to certain aspects of the present disclosure.
Figure 10:
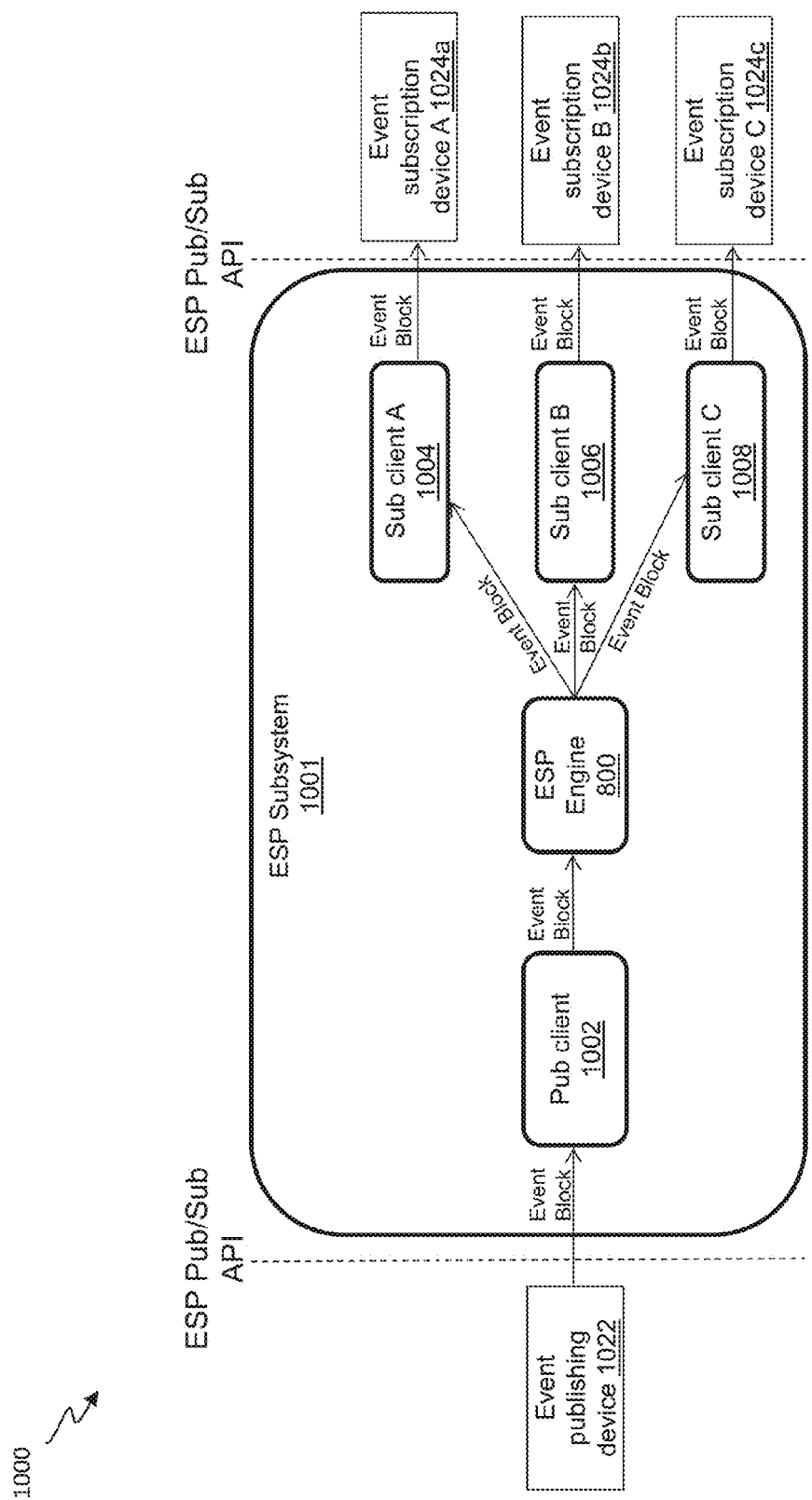
FIG. 10 illustrates an ESP system interfacing between a publishing device and multiple event subscribing devices, according to certain aspects of the present disclosure.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system. In some cases, one or more servers within a server farm can handle a portion or all of the aspects of solving SPSVMs as described herein, such as with reference to FIGS. 11-16.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application. In some cases, the cloud network 116 can perform a portion or all of the aspects of solving SPSVMs as described herein, such as with reference to FIGS. 11-16.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2. In some cases, the data from IoT devices can be used as the data of a dataset being processed by the SPSVM solver.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
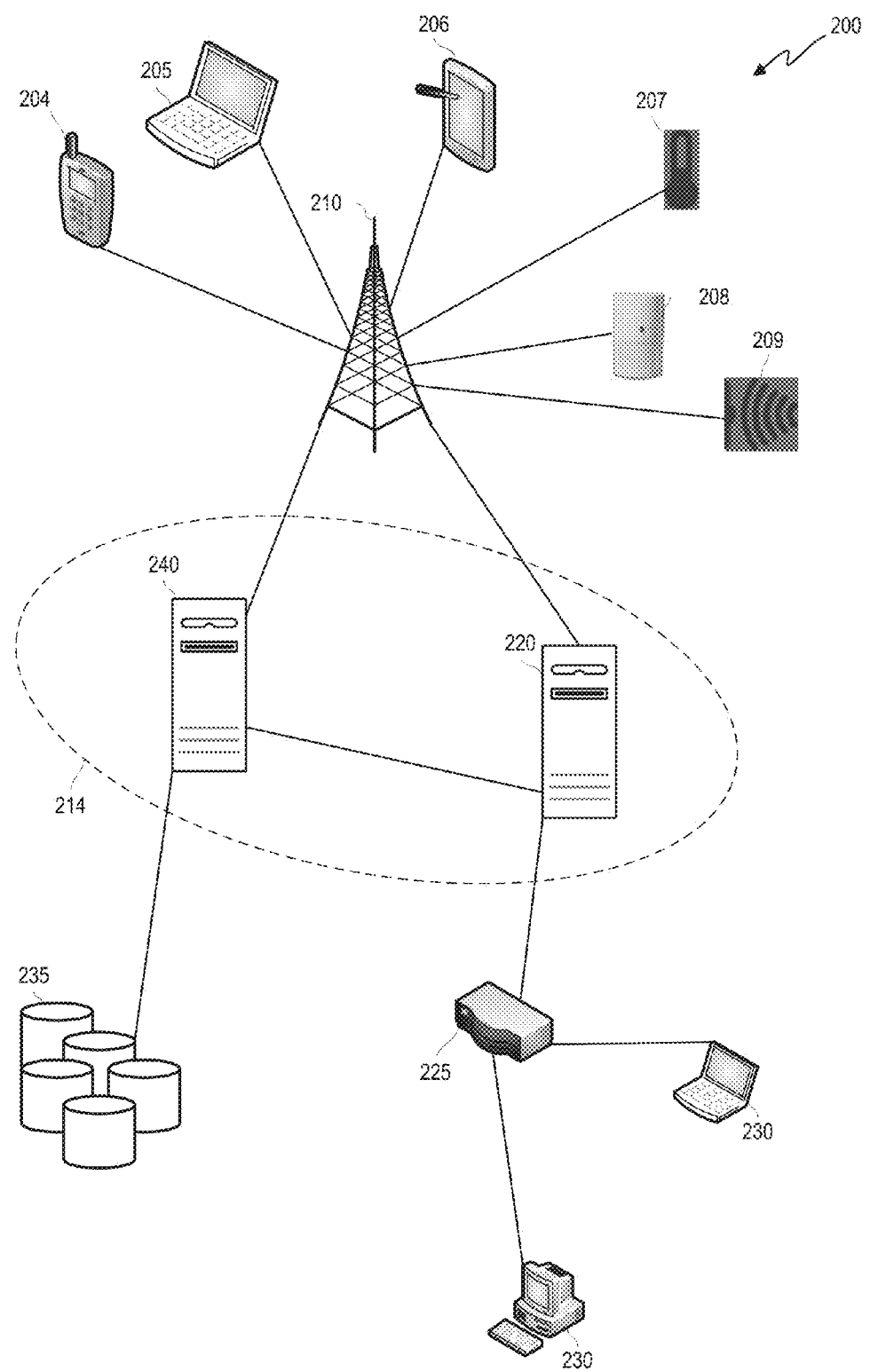
FIG. 2 illustrates an example network including an example set of devices communicating with each other over an exchange system and via a network, according to certain aspects of the present disclosure.

FIG. 2 illustrates an example network including an example set of devices communicating with each other over an exchange system and via a network, according to certain aspects of the present disclosure. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse. The various data associated with an oil drilling system can be used as input to an SPSVM solver as disclosed herein.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device. The various data associated with automation networks can be used as input to an SPSVM solver as disclosed herein.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient. The various data associated with a power or energy grid can be used as input to an SPSVM solver as disclosed herein.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
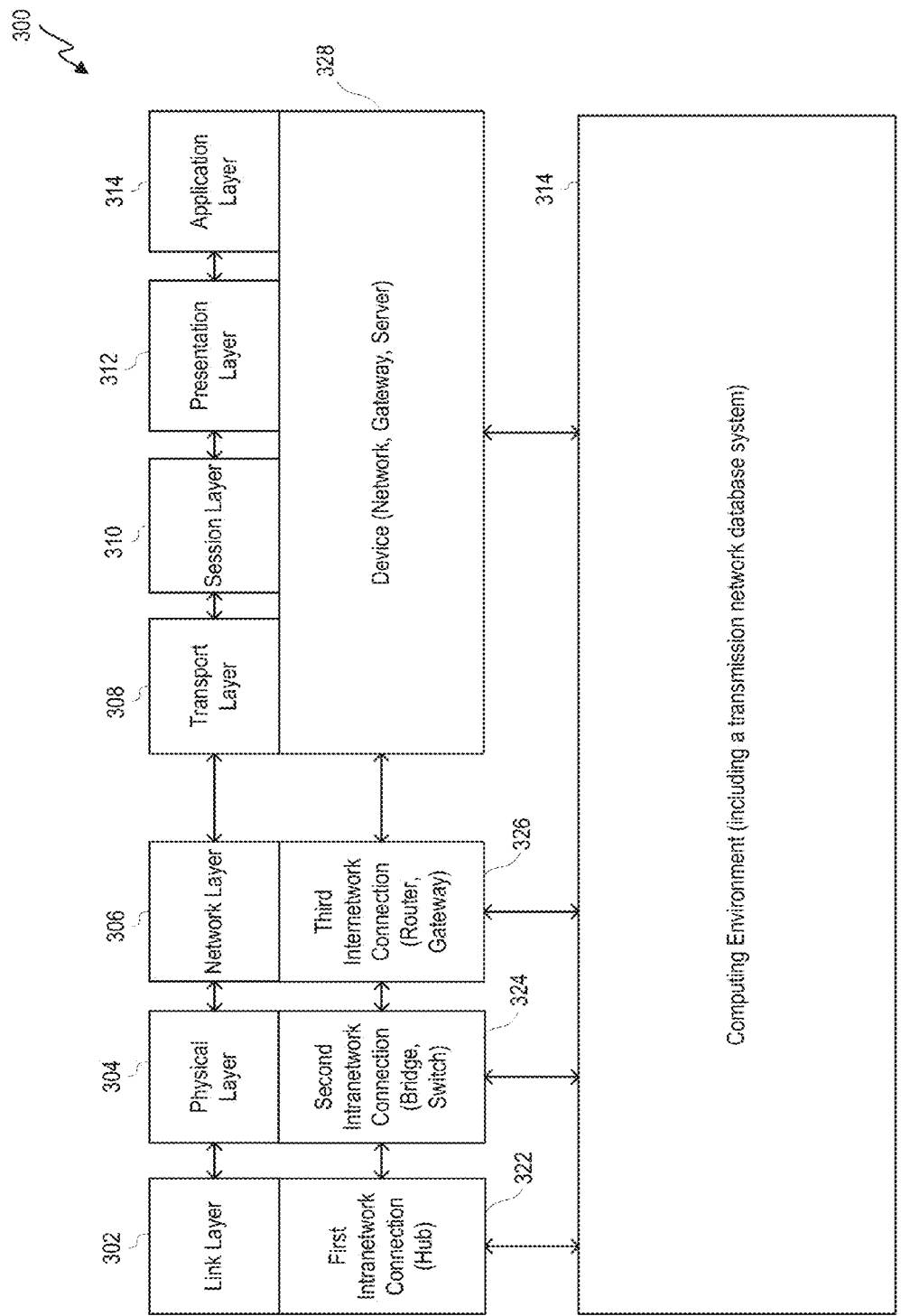
FIG. 3 illustrates a representation of a conceptual model of a communications protocol system, according to certain aspects of the present disclosure.

FIG. 3 illustrates a representation of a conceptual model of a communications protocol system, according to certain aspects of the present disclosure. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
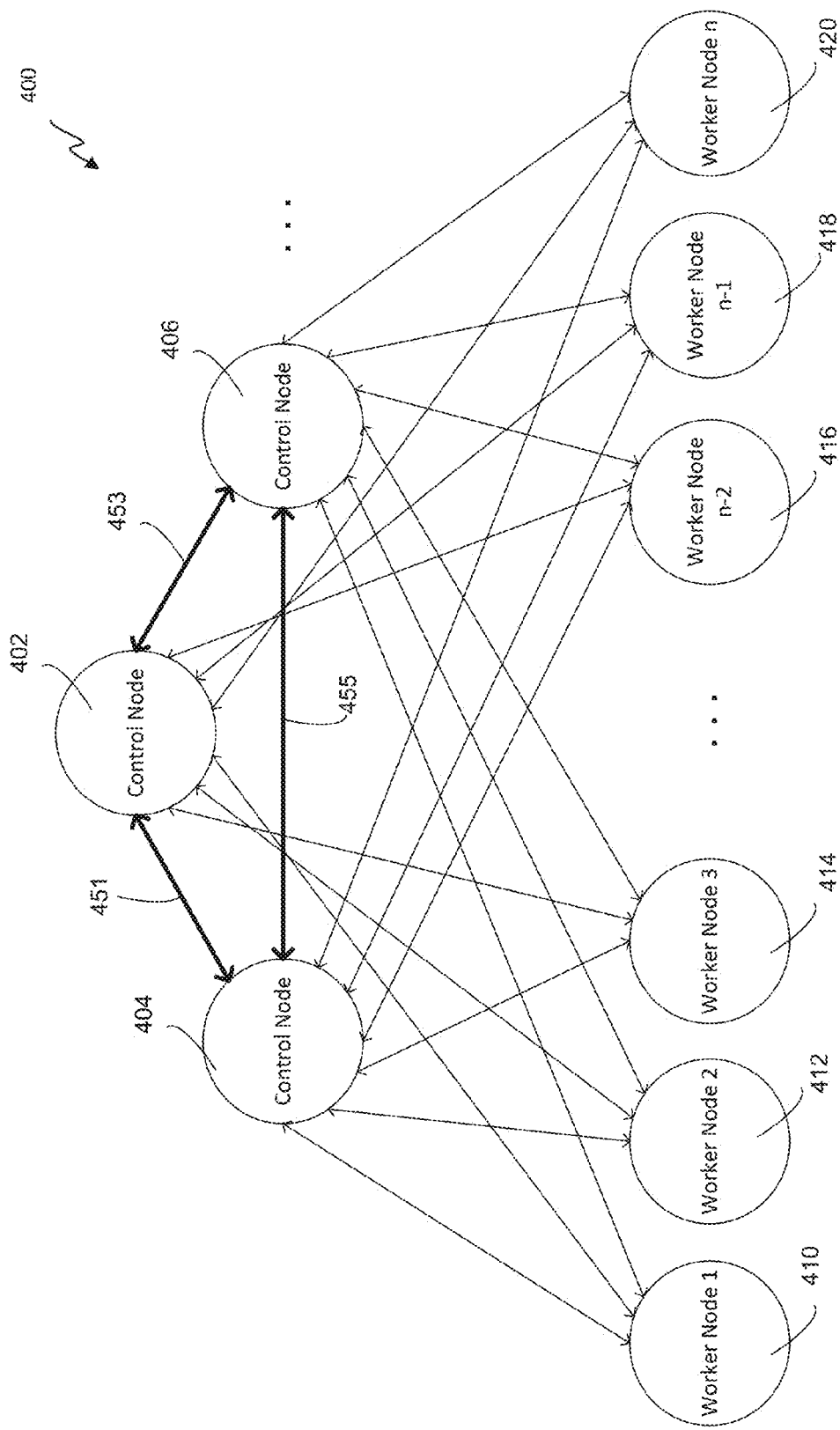
FIG. 4 illustrates a communications grid computing system including a variety of control and worker nodes, according to certain aspects of the present disclosure.

FIG. 4 illustrates a communications grid computing system 400 including a variety of control and worker nodes, according to certain aspects of the present disclosure. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or fewer than three control nodes.

Communications grid computing system (or just "communications grid") 400 also includes one or more worker nodes. Shown in FIG. 4 are six worker nodes 410-420. Although FIG. 4 shows six worker nodes, a communications grid according to certain aspects of the present disclosure may include more or fewer than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job (e.g., a classification request) to the node. The project may include a data set. The data set may be of any size. Once the control node receives such a project including a large data set, the control node may distribute the data set or projects related to the data set to be performed by worker nodes. For example, when solving an SPSVM, each worker node may perform a distinct project or portion of a project (e.g., determining values for a regularization parameter, calculating an initial solution to an SPSVM for an initial regularization value, calculating a subsequent solution to an SPSVM, or any combination of one or more of the aspects described with reference to FIGS. 11-13) on a full dataset, or each worker node may perform a project or portion of a project on a portion of the full dataset. In some cases, for a project including a large data set, the data set may be received or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project (e.g., a classification request to be processed using an SPSVM solver) is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result (e.g., a classification response or SPSVM solution) for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
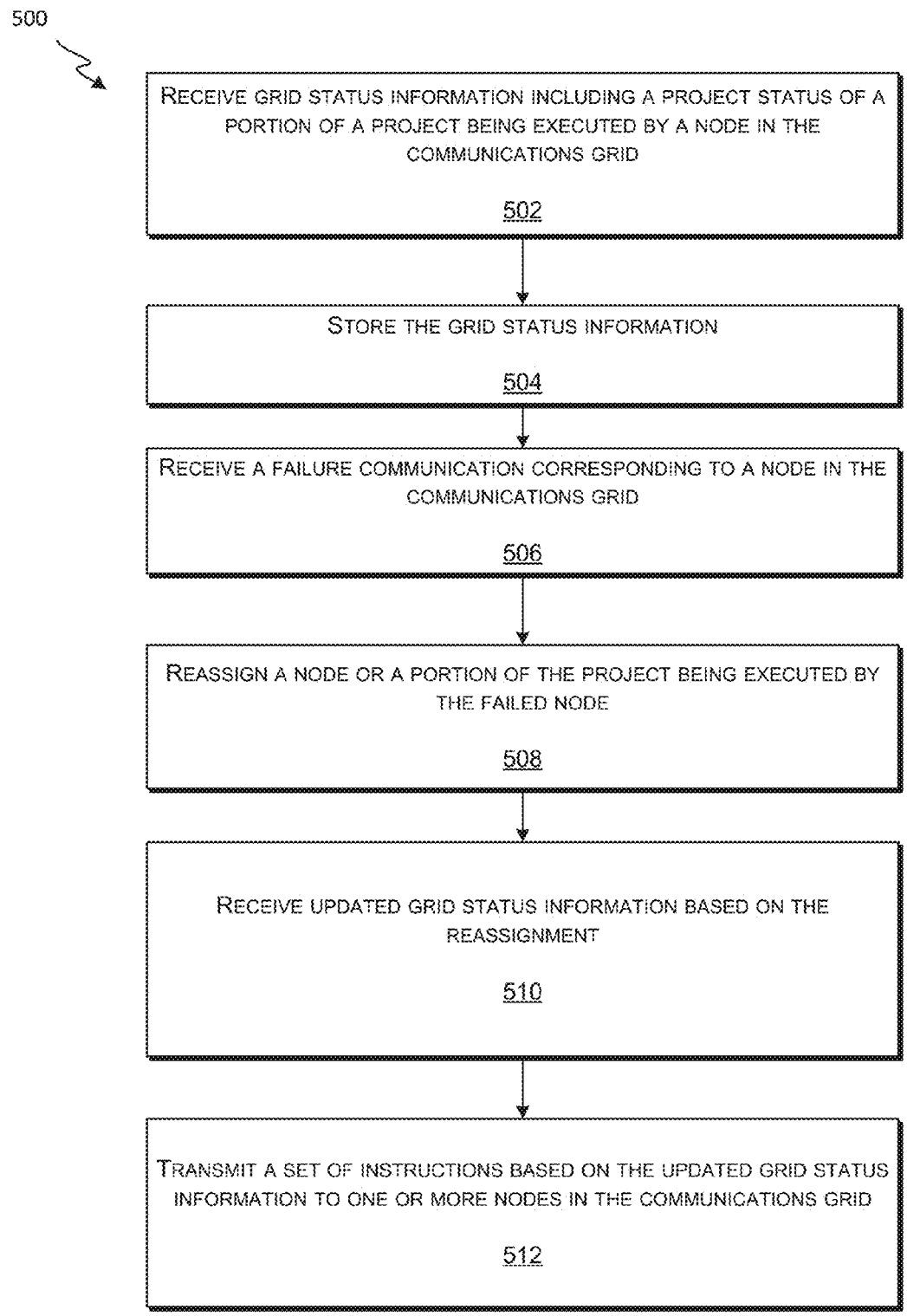
FIG. 5 illustrates a flow chart showing an example process for adjusting a communications grid or a work project in a communications grid after a failure of a node, according to certain aspects of the present disclosure.

FIG. 5 illustrates a flow chart showing an example process for adjusting a communications grid or a work project in a communications grid after a failure of a node, according to certain aspects of the present disclosure. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project (e.g., steps of solving an SPSVM as disclosed herein) being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
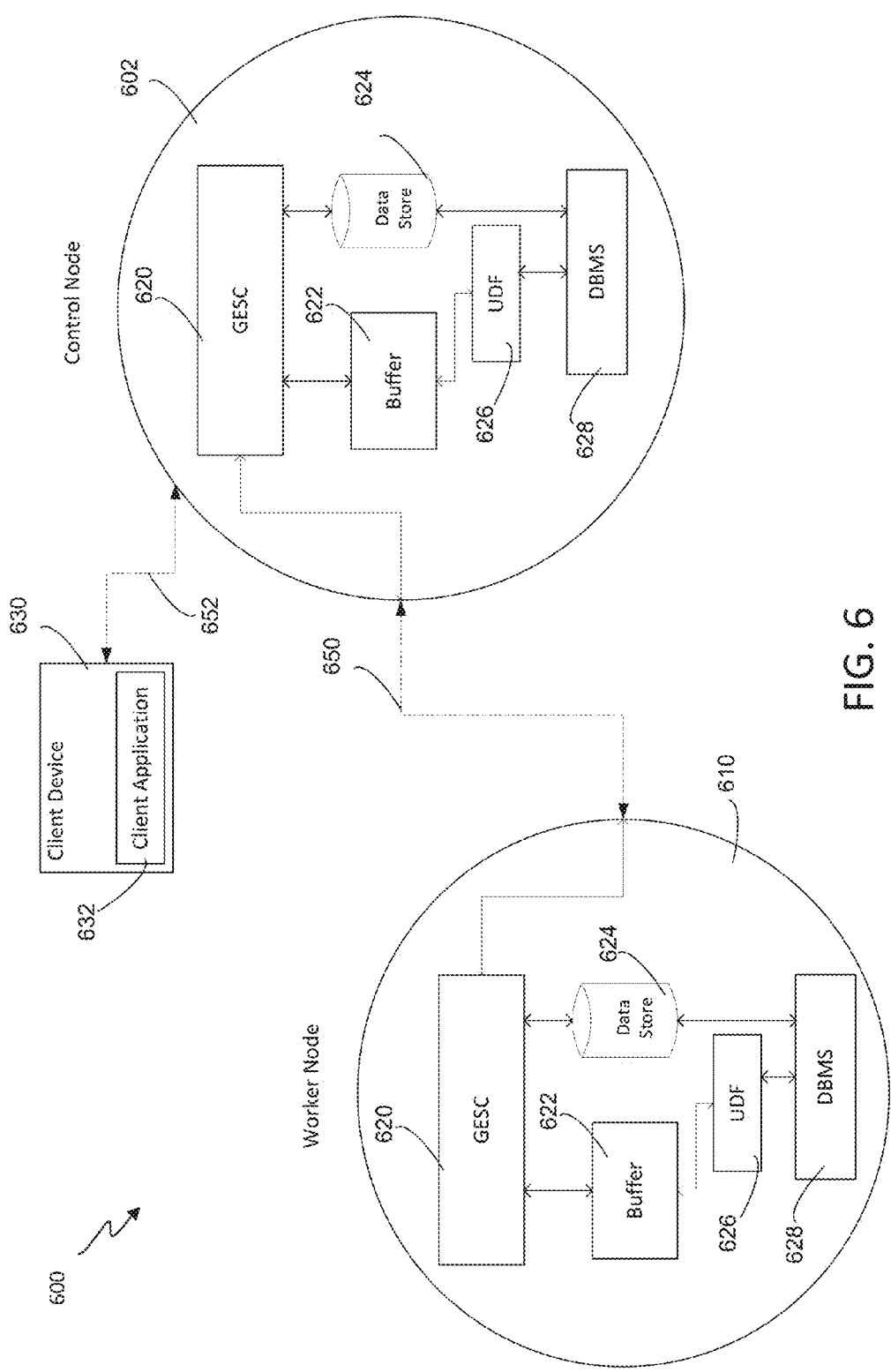
FIG. 6 illustrates a portion of a communications grid computing system including a control node and a worker node, according to certain aspects of the present disclosure.

FIG. 6 illustrates a portion of a communications grid computing system 600 including a control node and a worker node, according to certain aspects of the present disclosure. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment (e.g., a portion or all of a dataset to be classified using an SPSVM as disclosed herein). Data stores 624 may also store any intermediate or final data generated by the computing system after being processed (e.g., a portion or all of a solved SPSVM or a portion or all of a classification response), for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
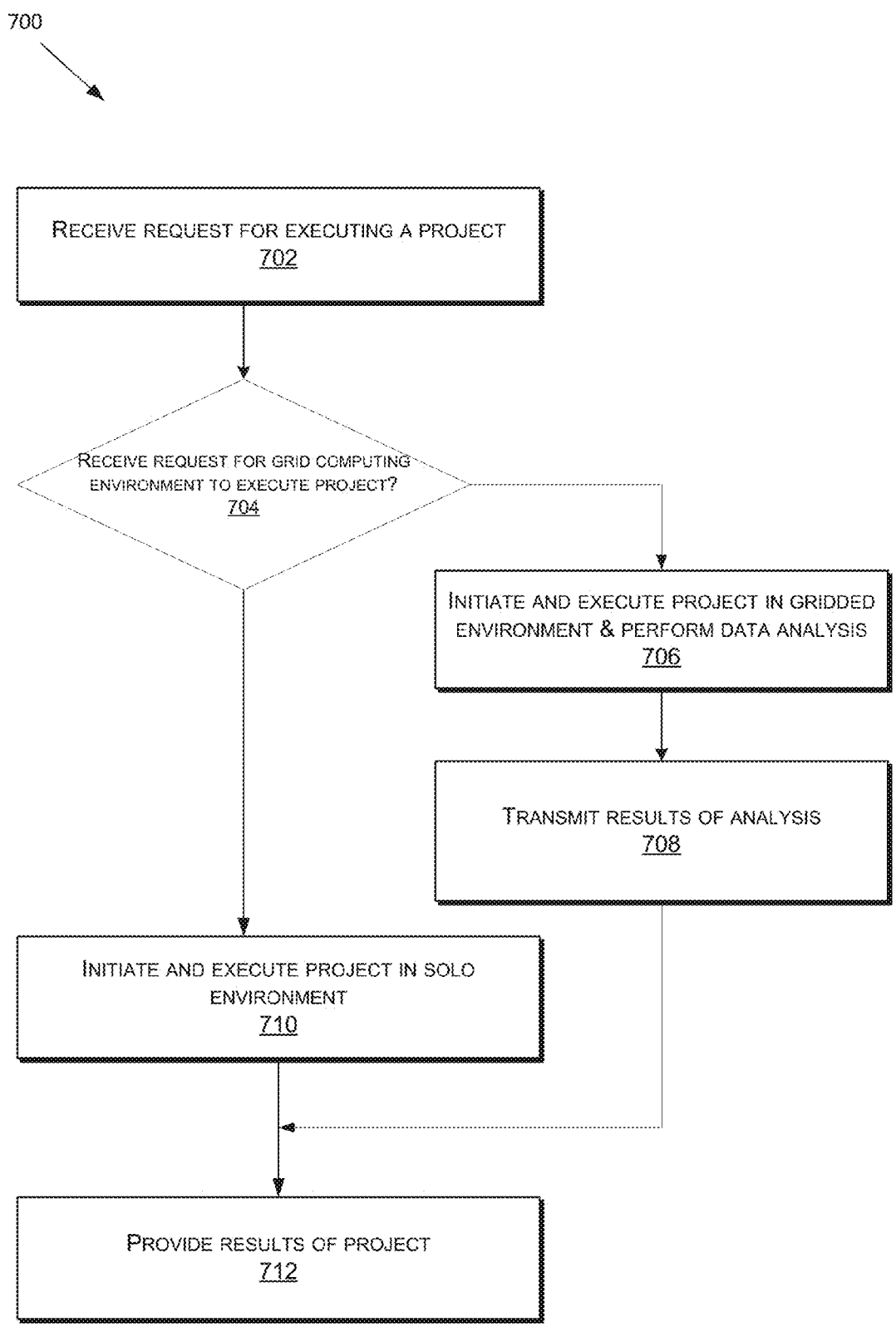
FIG. 7 illustrates a flow chart showing an example process for executing a data analysis or processing project, according to certain aspects of the present disclosure.

FIG. 7 illustrates a flow chart showing an example method 700 for executing a project within a grid computing system, according to certain aspects of the present disclosure. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to certain aspects of the present disclosure. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to certain aspects of the present disclosure. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to certain aspects of the present disclosure. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

The various systems, devices, components, and methods described in FIGS. 1-10 can be used to solve a sparse Support Vector Machine (SPSVM) as described in further detail herein. Certain aspects and features of the present disclosure relate to accelerating an SPSVM by precisely identifying inactive features in the optimal solution of a L1 norm regularized SPSVM, such as an L1 norm regularized L2 loss support vector machine (L1L2-SVM), and removing those inactive features before training the L1L2-SVM. Model selection for an SPSVM involves solving a series of models with a series of differing regularization parameters before selecting the best model to use. Variational inequality for constructing a tight convex set can be used to compute bounds for safely screening inactive features in different situations, such that every feature indicated as inactive is guaranteed to be inactive in the optimal solution for a particular model. In other words, the results of one model can be used to predict which inactive features to exclude when solving the subsequent model. Thus, the systems and techniques described herein can achieve the same results, but using only a fraction of the processing time and computational power, as a traditional SPSVM training on a full feature set. The efficiency of model selection for L1L2-SVMs is thus greatly increased, especially for high-dimensional datasets.

The emergence of big-data analysis can pose new challenges for model selection with large-scale data that consist of tens of millions of samples and features. The use of SPSVMs can be computationally intensive and training an SPSVM can require many computational iterations in order to determine the optimal solution for the SPSVM. Many data storage, analysis, or transfer systems can utilize SPSVMs to their advantage. As the complexity and amount of features to be mapped using SPSVMs increase, the amount of computational time and power used increases. Certain aspects and features of the present disclosure can reduce the number of computational iterations necessary in order to determine optimal solutions for an SPSVM and can overall increase the efficiency of any devices processing the SPSVMs (e.g., a processor determining an optimal solution for an SPSVM).

During SPSVM model selection, a series of models must be solved in order to determine an optimal solution for the SPSVM. The SPSVM training can be greatly accelerated by using a solution for a model (e.g., the $k^{th}$ model) of the series of models to determine what features must be inactive in the next of the series of models (e.g., the $k^{th}+1$ model). By determining the inactive features, the SPSVM training (e.g., model solving) can exclude those inactive features when attempting to solve the next model in the series of models. Excluding can include processing the next model without considering the inactive features at all, or automatically setting a weighting coefficient for an inactive feature to zero. The process can be repeated until all of the series of models have been solved and the SPSVM has been trained. In this way, only features that are determined to be active (e.g., not inactive) are considered during at least most of the SPSVM training.

In some cases, the excluding inactive features includes processing the next model without considering the inactive features, thus allowing for processing of a smaller model. After processing the smaller model, the smaller model can be expanded to the full model by adding zeros to the model as necessary to account for the inactive features.

L1L2-SVMs are powerful predictive models for analyzing high-dimensional data and can generate results that have a high degree of interpretability and robustness. SPSVMs can be applied in numerous applications to solve problems in fields such as text mining, bioinformatics, and image processing. SPSVMs and their related model selection techniques can be implemented as powerful modeling procedures for fast model selection, as described herein.

The use of the techniques and systems disclosed herein can improve the processing speed, computational requirements, and/or power usage of any systems or processes utilizing SPSVMs. The systems and techniques herein can be especially helpful in the processing of high-feature and/or sparse data. Some examples of high-feature, sparse data can include textual data (e.g., news articles, website, emails, transcriptions, or other text-based data), biological data (e.g., genomic data or deoxyribonucleic acid microarray data), or other data (e.g., energy generation data or energy distribution data).

Model selection can be important for good performance of an SPSVM. However, with vast amounts of data and with high-dimensional data, the computational cost of traditional model selection can be prohibitive. Model selection for L1L2-SVMs can be accelerated, as described herein, by filtering features in each step of the model selection process. Every feature that is removed by the technique is determined to have a zero weight in the optimal solution. Therefore, a L1L2-SVM solver achieves the same result when using only the selected (e.g., non-inactive) features as when using the full feature set. The technique can dramatically speed up model selection for L1L2-SVM by efficiently removing a large number of inactive features. In experiments, the technique is able to speed up model selection for L1L2-SVM by factors of tens to hundreds.

Improvements to the model selection process can be made to enable more efficient model selection, thus allowing SPSVMs to be used for certain datasets where SPSVMs would have otherwise been computationally prohibitive due to computational cost, time, or other reasons.

In general, an L1-regularized sparse predictive modeling algorithm can be formulated as $\min_w \text{loss}(w)+\lambda\|w\|_1$, where $w \in \mathbb{R}^m$ contains the model coefficients, loss(w) is a loss function, and $\lambda \geq 0$ is the regularization parameter that balances between the loss function and the regularizer. When the hinge loss or its square form is used as the loss function, the resulting sparse model is the L1-regularized support vector machine (L1-SVM). The value of the regularization parameter ($\lambda$) can be very important to the performance of an L1-SVM. Model selection can be used to choose an appropriate value for the regularization parameter in order to achieve good performance. For example, given a series of regularization parameters (e.g., $\lambda_1 > \lambda_2 > \ldots > \lambda_k$), the corresponding solutions (e.g., $w^*_1, w^*_2, \ldots, w^*_k$) can be obtained and the best solution can be selected using a predefined criterion. Examples of predefined criterion can be accuracy or area under the curve (AUC) that is achieved by the resulting models on holdout samples.

In an example, a data set to be processed by an L1L2-SVM can be represented by $X \in \mathbb{R}^{n \times m}$, where the data set contains n samples (e.g., $X = (x_1, \ldots, x_n)$) for each of the m features (e.g., $X = (f_1^T, \ldots, f_m^T)^T$). In an example, the n samples can represent a number of sales transactions and the m features can represent a number of purchasable products.

Additionally, $y = (y_1, \ldots, y_n)$ can represent n class labels, where $y_i = \{-1, +1\}$ and $i = 1, \ldots, n$. Additionally, $w \in \mathbb{R}^m$ can represent be the m-dimensional weight vector, $\xi \geq 0$, $i = 1, \ldots, n$ can represent the n slack variables, and $b \in \mathbb{R}$ and $\lambda \in \mathbb{R}^+$ can represent the bias and the regularization parameter, respectively. The primal form of the L1L2-SVM can then be defined according to Equation 1, below.

$$\min_{\xi, w} \frac{1}{2} \sum_{i=1}^{n} \xi_i^2 + \lambda \|w\|_1, \quad \text{Equation 1}$$

$$\text{s.t. } y_i(w^T x_i + b) \geq 1 - \xi_i, \xi_i \geq 0.$$

Equation 1 specifies a convex problem having a non-smooth L1 regularizer, which can enforce that the solution is sparse. $w^*(\lambda)$ can represent the solution (e.g., the optimal solution) for Equation 1 for a given regularization parameter (e.g., $\lambda$). All features that have nonzero values in the solution (e.g., $w^*(\lambda)$) can be considered active features, while all other features can be considered inactive features. In practice, many features of the solution can be zero, and therefore the solution can be sparse, which can be more interpretable than a dense solution. The solution can define a hyper plane that separates the samples into classes (e.g., positive samples and negative samples) with a large margin.

The dual of L1L2-SVM can be defined according to Equation 2, below.

$$\min_{\theta} \left\| \theta - \frac{1}{\lambda} 1 \right\|_2^2, \quad \text{Equation 2}$$

$$\text{s.t. } \|\hat{f}_j^T \theta\| \leq 1, j = 1, \ldots, m,$$

$$\sum_{i=1}^{n} \theta_i y_i = 0, \theta \succeq 0.$$

In Equation 2, $\theta \in \mathbb{R}^n$ can be the n-dimensional dual variable. $\hat{f} = Yf$ can be the weighted feature and $Y = \text{diag}(y)$ can be a diagonal matrix. The regularization parameter $\lambda$ can control the sparsity of the optimal solution of the problem. The larger the $\lambda$ value, the more elements of the optimal solution may be zero. Therefore, the value of the regularization parameter $\lambda$ has a significant impact on the performance of a L1L2-SVM model. Model selection can be used to help choose an appropriate $\lambda$ for L1L2-SVM model to ensure good performance (e.g., model accuracy).

During model selection, a series of L1L2-SVM models can be fit by first picking a series (e.g., 1 through p) of predefined values for the regularization parameter, where $\lambda_1 > \lambda_2 > \ldots > \lambda_p$. Then, for each of the predefined values for the regularization parameter, corresponding solutions (e.g., weight values and dual variables, such as $(w_1, \theta_1), \ldots, (w_p, \theta_p)$) for the L1L2-SVM problem can be computed. Finally, the best solution can be determined based on established criterion—for example, by using the area under a receiver operating characteristic (ROC) curve on holdout samples.

In some cases, the optimal solution obtained in the kth step of model selection can be used to speed up model fitting in the (k+1)th step. Given an optimal solution $(w^*_k, \theta^*_k)$ when $\Delta = \lambda_k$, features can be identified that are guaranteed to have zero coefficients in the optimal solution $(w^*_{k+1}, \theta^*_{k+1})$ for the next step, when $\lambda = \lambda_{k+1}$. These features guaranteed to have zero coefficients in the optimal solution for the next step can be considered inactive features, and can therefore be filtered out of the model before computing the optimal solution for the (k+1)th step.

The relation between $\theta$ and w can be expressed according to Equation 3, below.

$$\theta^T \hat{f}_j = \begin{cases} \text{sign}(w_j), & \text{if } w_j \neq 0 \\ [-1, +1], & \text{if } w_j = 0 \end{cases}, \quad \text{Equation 3}$$

$$j = 1, \ldots, m$$

Equation 3 shows that the necessary condition for a feature f to be active in an solution is $|\theta^T \hat{f}| = 1$. On the other hand, for any feature f, if $|\theta^T \hat{f}| < 1$, it is to be inactive in the solution (e.g., optimal solution). Therefore, inactive features can be identified by screening features, for a given regularization parameter, to determine if the upper bound of $|\theta^T \hat{f}|$ is less than 1. The cost of computing the upper bounds can be much lower than training the L1L2-SVM with all features. To bound the value of $|\theta^T \hat{f}|$, a closed convex set K can be constructed that contains $\theta$. The upper bound can then be computed by maximizing $|\theta^T \hat{f}|$ over K.

Therefore, identifying inactive features can be accomplished by computing the upper bound of the dual constraint $|\hat{f}_j^T \theta|$. If $\sup_\theta (|\hat{f}_j^T \theta|) < 1$, then the $j^{th}$ feature is to be inactive. In other words, a feature is inactive, and thus its coefficient in the optimal solution must be zero, when the inner product of the weighted features and the dual variable is less than 1. Since the dual variable $\theta$ is unknown, computing $|\hat{f}_j^T \theta|$ can be highly nontrivial. However, a tight upper bound for $|\hat{f}_j^T \theta|$ can be computed efficiently using a previously-calculated dual solution. The tight upper bound for $|\hat{f}_j^T \theta|$ can be computed relatively quickly and with relatively low computational cost, based on a previously-calculated dual solution and using hemispherical constraints. Thus, the need to determine an exact or approximate solution for $|\hat{f}_j^T \theta|$, which can take a relatively long amount of time and be relatively computationally costly since the dual variable is unknown, is obviated.

Once an initial dual solution (e.g., $\theta^*_1$) for an initial value of the regularization parameter (e.g., $\lambda = \lambda_1$) is found, that solution can be used to construct a convex set that contains the next dual solution (e.g., $\theta^*_2$) for the next value of the regularization parameter (e.g., $\lambda = \lambda_2$). Then, an upper bound for the inner product of the weighted features and the dual variable (e.g., $|\hat{f}_j^T \theta_2^+|$) for the next value of the regularization parameter (e.g., $\lambda=\lambda_1$) can be calculated by maximizing the inner product of the weighted features and the dual variable (e.g., $|\hat{f}_j^T \theta|$) over that convex set.

Assuming knowledge of the optimal dual solution $\theta^*_1$ for $\lambda=\lambda_1$, a convex set K that constrains the optimal dual solution $\theta^*_2$ (e.g., where $\lambda=\lambda_2$ and where $\lambda_1<\lambda_2$) can be constructed. That convex set K can be defined by, and the optimal dual solution $\theta^*_2$ would reside in, the region that is defined by Equation 4 (e.g., a hyper-plane), Equation 5 (e.g., a half space), and Equation 6 (e.g., a hyper-ball), below. To ensure the upper bound of $|\hat{f}_j^T \theta|$ is tight, the convex set must be tight. A variational inequality technique can be used to construct a tight convex set. Assuming $\theta^*$ is an optimal solution of a convex function g (e.g., min $g(\theta)$, s.t.$\theta \in K$) where g is continuously differentiable and K is closed and convex, then the following variational inequality holds that $\nabla g(\theta^*)^T (\theta - \theta^*) \geq 0, \forall \theta \in K$.

This same technique can be applied to the dual formulation of the L1L2-SVM (e.g., $\min_\theta \frac{1}{2} \|\theta - 1/\lambda\|_2^2$, s.t. $\|\hat{f}_j^T \theta\| \leq 1$, $\theta^T y = 0, \theta \geq 0$) using an initial regularization parameter (e.g., $\lambda_1$) and its corresponding solution $\theta_1$ to construct a convex set. When the initial regularization parameter (e.g., $\lambda_1$) is close to the next regularization parameter (e.g., $\lambda_2$), the convex set can be tighter. The initial regularization parameter can be greater than the next regularization parameter (e.g., $\lambda_1 > \lambda_2$). The results of applying the variational inequality technique to the dual formulation of the L1L2-SVM are shown below in Equation 4, Equation 5 for $1/\lambda_1$, $\theta_1$, and Equation 6 for $1/\lambda_2$, $\theta_2$.

$$\theta_2^T y = 0 \qquad \text{Equation 4}$$

$$\left(\theta_1 - \frac{1}{\lambda_1}\right)^\top (\theta_2 - \theta_1) \geq 0 \qquad \text{Equation 5}$$

$$\left(\theta_2 - \frac{1}{\lambda_2}\right)^\top (\theta_1 - \theta_2) \geq 0 \Rightarrow \left(\frac{1}{\lambda_2} - \theta_2\right)^2 (\theta_1 - \theta_2) \leq 0 \qquad \text{Equation 6}$$

The region defined by Equations 4-6 represents an intersection of a hyper-ball, a half space, and a hyper-plane. Letting $\theta$ be considered as an n dimensional vector, Equations 4-6 define a hemisphere in an n−1 dimensional space. Therefore, Equations 4-6 form a hemisphere constraint on $\theta^*_2$. Therefore, $|\hat{f}_j^T \theta^*_2| < \max_{\theta \in K}|$, where K is the convex set.

Calculation of the upper bound of $|\hat{f}_j^T \theta|$ can be further performed by defining parameters a, b, and c according to Equations 7, 8, and 9, below.

$$a = \frac{\frac{1}{\lambda_1} - \theta_1}{\left\|\frac{1}{\lambda_1} - \theta_1\right\|_2} \qquad \text{Equation 7}$$

$$b = \frac{1}{2}\left(\frac{1}{\lambda_2} - \theta_1\right) \qquad \text{Equation 8}$$

$$c = \frac{1}{2}\left(\frac{1}{\lambda_2} + \theta_1\right) \qquad \text{Equation 9}$$

Letting $\theta_2 = c + r$, the upper bound can then be computed by solving the convex problem of Equation 10, below. Since Equation 10 is a convex problem, it has a single solution and thus can be solved with relatively low computational cost and time.

$$\max|\theta^T \hat{f}| = \max|(c+r)^T \hat{f}|$$

$$\text{s.t. } a^T(b+r) \leq 0, \|r\| - \|b\| \leq 0, (c+r)^T y = 0 \qquad \text{Equation 10}$$

Further, Equation 10 can be expressed as shown in Equation 11, below.

$$\max|(c+r)^T \hat{f}| = \max(m_1, m_2)$$

$$m_1 = -\min(r^T \hat{f}) - c^T \hat{f}$$

$$m_2 = -\min(r^T(-\hat{f})) + c^T \hat{f} \qquad \text{Equation 11}$$

Therefore, computing the upper bound can be accomplished by solving Equation 12, below.

$$\min(r^T \hat{f}) \text{ s.t. } a^T(b+r) \leq 0, \|r\| - \|b\| \leq 0, (c+r)^T y = 0 \qquad \text{Equation 12}$$

Equation 12 has a closed form solution, as follows, according to Equations 13-15, where $P_u(v)$ is defined according to Equation 16, below. The circumstances satisfying Equations 13 and 14 can be very rare, and thus Equation 15 can be more commonly used to determine the minimal value of $r^T \hat{f}$.

$$\text{When } \frac{|P_y(a)^\top P_y(\hat{f})|}{\|P_y(a)\| \|P_y(\hat{f})\|} = 1, \qquad \text{Equation 13}$$

the solution can be expressed as $$\min(r^\top \hat{f}) = \frac{\|P_y(\hat{f})\|}{\|P_y(a)\|} a^\top \theta_1 - c^\top \hat{f}.$$

$$\text{When } P_y(a)^\top \left(\frac{P_y(b)}{\|P_y(b)\|} - \frac{P_y(\hat{f})}{\|P_y(\hat{f})\|}\right) \leq 0, \qquad \text{Equation 14}$$

the solution can be expressed as $$\min(r^\top \hat{f}) = \|P_y(b)\| \|P_y(\hat{f})\| + P_y(b)^\top P_y(\hat{f}) - \hat{f}^\top b$$

Otherwise $$\left(e.g., \text{ when } \frac{|P_y(a)^\top P_y(\hat{f})|}{\|P_y(a)\| \|P_y(\hat{f})\|} \neq 1 \text{ and } P_y(a)^\top \left(\frac{P_y(b)}{\|P_y(b)\|} - \frac{P_y(\hat{f})}{\|P_y(\hat{f})\|}\right) > 0\right),$$

the solution can be expressed as $$\min(r^\top \hat{f}) = \frac{1}{2}\left(\frac{1}{\lambda_2} - \frac{1}{\lambda_1}\right)\left(\|P_{P_a(y)}(P_a(\hat{f}))\| \|P_{P_a(y)}(P_a(1))\| + P_{P_a(y)}(P_a(\hat{f}))^\top P_{P_a(y)}(P_a(1)) - P_a(1)^\top P_a(\hat{f})\right)$$

In Equations 13-15, $P_u(v)$ can be defined according to Equation 16, below.

$$P_u(v) = v - \frac{v^\top u}{\|u\|^2} u \qquad \text{Equation 16}$$

Therefore, because the upper bound of $|\hat{f}_j^T \theta|$ can be readily determined for a particular feature as described above, it can be determined whether or not that feature is inactive. By identifying inactive features, as described above, the SPSVM training process can leverage the ability to filter out inactive features during model selection. Thus, an algorithm can be used to remove inactive features before each step of the model selection process to reduce the search space for fitting or training an L1L2-SVM model. An exemplary algorithm is shown in Table 1, below, where $\text{neg\_min}(\hat{f}) = -\min(r^T \hat{f}) - c^T \hat{f}$, as described above, which computes $-\min \theta_2^T \hat{f}$ according to the situations described above with reference to Equations 13-15. In some cases, $P_u(-v) = -P_u(v)$, the intermediate results computed for $\text{neg\_min}(\hat{f})$ can be used by $\text{neg\_min}(-\hat{f})$ to accelerate its computation.

TABLE 1

| | INPUT: $X \in \mathbb{R}^{n \times m}$, $y \in \mathbb{R}^n$, $\lambda_1, \lambda_2, \theta_1 \in \mathbb{R}^n$ OUTPUT: $\mathbb{L}$, the retained feature list. |
|---|---|
| 1 | $\mathbb{L} = \emptyset$, i = 1, Y = diag(y); |
| 2 | for i ≤ m do |
| 3 | $\hat{f} = Y f_i$; |
| 4 | $m_1 = \text{neg\_min}(\hat{f})$, $m_2 = \text{neg\_min}(-\hat{f})$ |
| 5 | $m = \max\{m_1, m_2\}$; |
| 6 | if m ≥ 1 then |
| 7 | $\mathbb{L} = \mathbb{L} \cup \{i\}$; |
| 8 | end |
| 9 | i = i + 1 |
| 10 | End |
| 11 | return $\mathbb{L}$; |

The example algorithm of Table 1 can take as input a dataset X having n samples and m features, a set of class labels y, an initial regularization parameter $\lambda_1$, a next regularization parameter $\lambda_2$, and a solution corresponding to the first regularization parameter $\theta_1$. The algorithm can output a list $\mathbb{L}$ of potentially active features in the optimal solution corresponding to the next regularization parameter $\lambda_2$. The list $\mathbb{L}$ can be generated by evaluating each of the n features of the dataset X and adding only those features that are not identified as inactive. In some cases, the list $\mathbb{L}$ can be generated by taking the n features of the dataset X and removing those features identified as inactive.

The algorithm can include a process (e.g., lines 2-10 of the example algorithm of Table 1) for evaluating a feature, which can be looped for each of the m features of dataset X. As part of the process for evaluating a feature, the algorithm can weight the feature using Y (e.g., at line 3 of the example algorithm of Table 1). The algorithm can then compute $\max|\hat{f}^T \theta|$ for the feature, as described above (e.g., at lines 4-5 of the example algorithm of Table 1). If the value of $\max|\hat{f}^T \theta|$ is larger than 1, the feature being evaluated is added to the list $\mathbb{L}$ (e.g., at lines 6-7 of the example algorithm of Table 1). The worst case for implementing the example algorithm of Table 1 results in a total computational cost for screening a data set having m features and n samples is O(mn), and a worst case for implementing the example algorithm assuming current values are known (e.g., knowledge of $\hat{f}^T \theta_1$, $f^T 1$, $f^T y$, and $f^T f$) can result in a total computational cost for screening the data set to just O(m). By contrast, standard approaches (e.g., without identifying inactive features) may have a much higher computational cost (e.g., much higher worst case computational costs).

To ensure efficiency, the computation at each step can be decomposed to many small substeps so that intermediate results obtained in preceding substeps can be used by the following substeps to accelerate computation. Also, the substeps can be organized and ordered so that no redundant computation is performed.

An example algorithm for performing the accelerated model selection techniques described herein can include the following basic aspects. A dataset can be accessed. The dataset can track a number of features across a number of samples. A series of values for a regularization parameter of a sparse support vector machine model can be determined. The sparse support vector machine model can be a L1 norm regularized L2 loss support vector machine model. The values can be predefined values. The initial regularization value can be a value associated with the smallest number of features. An initial solution to the support vector machine model for the initial regularization value can be computed. One or more inactive features of the next regularization value can be determined using the initial solution. A feature can be evaluated by determining an upper bound for an inner product of the weighted feature and the dual solution for the next regularization value of the regularization parameter. If this upper bound is less than one, the feature is inactive in the optimal solution for that next regularization parameter. Determining the upper bound can include determining an initial dual variable for the initial regularization value using the initial solution, constraining the dual variable for the next regularization value to a convex set using the initial dual variable, and determining the upper bound by calculating a maximum value of the convex set.

The systems and techniques described herein can vastly improve an SPSVM solver's performance. For example, initial experiments showed that the systems and techniques described herein can effectively identify a large number of inactive features before model fitting or training, which can result in a dramatic increase in speed of model selection for L1L2-SVM. In an example experiment, five benchmark datasets were used, as will be described below with reference to Tables 2 and 3.

A "gli 85" dataset was used that included microarray data used to profile and categorize gliomas, a type of tumor commonly found in brains, in human patients. This dataset has a very high feature-to-sample ratio. The number of samples correlate to the number of gliomas studied and the number of features correlate to the number of gene expressions tested. While a large number of gene expressions were found in the samples (e.g., a large number of features), the optimal solution is sparse, because the gene expressions that are actually useful in categorizing the gliomas are only a small percentage of all the possible gene expressions tested. Significant computing time was saved in processing the gli 85 dataset when using the techniques described herein because the large number of inactive features (e.g., gene expressions that are not indicative of the categorization of a glioma) did not need to be considered during training of the SPSVM.

A "rcv1b" dataset, also known as rcv1.binary, was used that included textual data. The rcv1b dataset is a commonly used SPSVM testing dataset for categorizing samples into one of two classes. The number of features is greater than the number of samples. The number of samples relate to the number of records (e.g., documents) and the number of features relate to the number of words used.

A "real-sim" dataset was used that included textual data. The real-sim dataset is a commonly used SPSVM testing dataset for categorizing samples into one of two classes: real or simulated. This dataset contains articles pertaining to either real activities (e.g. racing) or simulated activities (e.g. simulated racing). This dataset has a very low feature-to-sample ratio. The number of samples relates to the number of articles and the number of features relate to the number of words used.

A "news20b" dataset, also known as news20.binary, was used that included textual data. The news20b dataset is a commonly used SPSVM testing dataset for categorizing samples into one of two classes. This dataset has a very high feature-to-sample ratio. The number of samples relate to the number of records (e.g., documents) and the number of features relate to the number of words used.

A "kddb" dataset, also known as kdd2010 bridge-to-algebra, was used that included educational mined data, taking the form of records of interactions between students and computer-aided tutoring systems. The data can be classified in order to predict whether a given answer is a correct given answer. The data in this dataset takes the form of records containing various entries (e.g., identifying which problem is being solved, which step in the problem is being solved, the number of correct attempts, etc). The number of samples relate to the number of records (e.g., recorded student-computer interactions) and the number of features relate to the number of variables present throughout the dataset (e.g., possibilities for the various entries in the records).

The number of samples and features for each of the example data sets are shown below in Table 2. Datasets with higher feature-to-sample ratios receive a larger percentage increase in speed when the disclosed acceleration techniques are applied.

TABLE 2

| Data Set | Sample (n) | Feature (m) | m/n |
|---|---|---|---|
| gli85 | 85 | 22283 | 262.15 |
| rcv1b | 20242 | 47236 | 2.33 |
| real-sim | 72309 | 20958 | 0.29 |
| news20b | 19996 | 1355191 | 67.77 |
| kddb | 19264097 | 29890095 | 1.55 |

For each dataset, a coordinate gradient descent (CGD) solver is used to solve the SPSVM according to three techniques. First, a standard technique (org) is used to solve the SPSVM without the proposed accelerating technique. Then, the proposed accelerating technique (scr) is used to screen the Table 3, below, shows an example of the total run time of the L1L2-SVM with no acceleration, with acceleration using the proposed technique (e.g., exclusion of inactive features) and with acceleration using the proposed technique and a warm start technique. The warm start technique involves computing the $w^*_k$ by using the $w^*_{k-1}$ obtained in the (k−1)th iteration as the initial point for searching the optimal solution. The total run times shown in Table 3 are shown in seconds.

TABLE 3

| Technique | gli85 | rcv1b | real-sim | news20b | kddb |
|---|---|---|---|---|---|
| No acceleration | 328.7 | 17.92 | 20.81 | 943.67 | 9209.06 |
| With Acceleration (exclusion of inactive features) | 0.78 | 3.35 | 6.67 | 25.53 | 1126.05 |
| With Acceleration and Warm Start | 0.74 | 1.78 | 4.3 | 17.84 | 831.87 |

Table 3 shows that the systems and techniques described herein for screening features (e.g., by filtering out inactive features) during model selection can lead to a drastic increase in the speed of model selection for an L1L2-SVM. The systems and techniques described herein can greatly improve model selection efficiency by stably eliminating a large number of inactive features.

FIG. 11 is a flowchart depicting an example of a process 1100 for solving a support vector machine model according to certain aspects of the present disclosure. At block 1102, a dataset is accessed. The dataset can contain data that tracks a plurality of features (e.g., a high-feature dataset). For example, the dataset can contain textual data having many different terms. The presence/absence of each term can be a feature in such a high-feature dataset.

In some cases, where the SPSVM is being solved by a grid (e.g., a plurality of node computers), each node can access a subset of the full dataset at block 1102 (e.g., data-parallel processing, where different data is evaluated on each of the plurality of nodes). In some cases, each node can access the full dataset at block 1102, but perform distinct processing parts (e.g., any combination of one or more of the processing parts described with reference to FIGS. 11-13) the from one another (e.g., evaluating different features on different nodes). In some cases, grid-based screening of features during SPSVM solving can provide for faster solving.

At block 1104, predefined values for the regularization parameter are determined. The predefined values can be determined such that the lowest value (e.g., $\lambda_1$) corresponds to fewer features than the next lowest value (e.g., $\lambda_2$), and so forth up to the last of the predefined values (e.g., $\lambda_p$). In some cases, an initial regularization value (e.g., $\lambda_k$) corresponding to the fewest number of features can be determined at optional block 1106. In some cases, the initial regularization value corresponds to only a single feature.

At block 1108, an initial solution to the support vector machine model is calculated. The initial solution (e.g., $w_k \theta_k$) can be calculated normally, with all features corresponding to the initial regularization value (e.g., $\lambda_k$) being considered. The initial regularization value can be the lowest (e.g., $\lambda_1$) of the series of predefined values determined at block 1104. As used herein, the term "initial" (e.g., "initial regularization value") can be used to refer to an item's relation to a "next" (e.g., "next regularization value") item, and does not preclude the possibility that another item is prior to the "initial" item. In other words, the initial regularization value may be the first regularization value processed for a particular SPSVM, but need not be the first regularization value processed for that SPSVM.

At block 1110, inactive features of the support vector machine model for the next regularization value (e.g., $\lambda_{k+1}$) are identified. Identification of the inactive features at block 1110 is accomplished using the initial solution (e.g., $w_k \theta_k$) determined at block 1108.

At block 1112, a next solution (e.g., $w_{k+1} \theta_{k+1}$) to the support vector machine model is calculated using only features not identified as inactive at block 1110. In other words, the calculation at block 1112 for the next regularization value (e.g., $\lambda_{k+1}$) continues similarly to the calculation of block 1108 for the initial regularization value (e.g., $\lambda_k$), except any features identified as inactive at block 1110 are excluded for the purpose of calculating the solution to the support vector machine model. Example ways to exclude an inactive feature can include simply ignoring it (e.g., processing the next model without considering the inactive feature at all) or automatically setting the weighting coefficient for the inactive feature to zero.

In some cases, the process 1100 can continue in a loop (e.g., looping from block 1112 to block 1110) by using one step's solution to identify (e.g., at block 1110) inactive features for the calculation (e.g., at block 1112) of the solution of the next step. For example, the next regularization value and next solution calculated during a first iteration of the process 1100 can be used as the initial regularization value and initial solution during a second iteration of the process 1100. When all steps have been solved (e.g., through $\lambda_p$), then the process 1100 can end.

The result of process 1100 can include a trained sparse support vector machine. The result can include an overall solution to the sparse support vector machine. The overall solution can be obtained by compiling together the various solutions obtained in process 1100, such as the solutions obtained at blocks 1108 and 1112 (e.g., an initial solution and a next solution). The overall solution can be applied to a dataset to classify data within the dataset.

Figure 12:
FIG. 12 is a flowchart depicting an example of a process for identifying inactive features of a sparse support vector machine model according to certain aspects of the present disclosure.

FIG. 12 is a flowchart depicting an example of a process 1200 for identifying inactive features of a support vector machine model according to certain aspects of the present disclosure. The process 1200 can be used at block 1110 of process 1100 of FIG. 11.

At block 1202, an upper bound for an inner product of a weighted feature and the dual variable for the next regularization value of the regularization parameter (e.g., $|\hat{f}_j^T \theta^*_{k+1}|$, as disclosed above) can be determined. At block 1204, the upper bound is checked as to whether or not it is greater than one. If the upper bound is greater than one, the weighted feature is identified as being inactive at block 1206. If the upper bound is not greater than one, then the weighted feature is not identified as being inactive at block 1208. In some cases, identifying a feature as inactive at block 1206 can include adding the feature to a list of inactive features or not adding the feature to a list of active features. Likewise, identifying a feature as not inactive at block 1208 can include not adding the feature to a list of inactive features or adding the feature to a list of active features.

Figure 13:
FIG. 13 is a flowchart depicting an example of a process for determining an upper bound for an inner product of a weighted feature an the dual variable for a predefined value of the regularization parameter using a previous solution according to certain aspects of the present disclosure.

FIG. 13 is a flowchart depicting an example of a process 1300 for determining an upper bound for an inner product of a weighted feature an the dual variable for a predefined value of the regularization parameter using a previous solution according to certain aspects of the present disclosure. The process 1300 can be used at block 1202 of process 1200 of FIG. 12.

At block 1302, an initial dual variable (e.g., $\theta_k$) for an initial regularization value (e.g., $\lambda_k$) of the regularization parameter can be determined using the initial solution (e.g., $(w_k \theta_k)$). The initial solution can be determined, for example, at block 1108 of FIG. 11.

At block 1304, the dual variable (e.g., $\theta_{k+1}$) for the next regularization value (e.g., $\lambda_{k+1}$) of the regularization parameter can be constrained to a convex set (e.g., K), as described above, using the initial dual variable determined at block 1302.

At block 1306, the upper bound for an inner product of a weighted feature and the dual variable for the next regularization value of the regularization parameter (e.g., $|\hat{f}_j^T \theta^*_{k+1}|$, as disclosed above) can be determined by calculating a maximum value of the convex set, as described above.

Figures 14, 15:
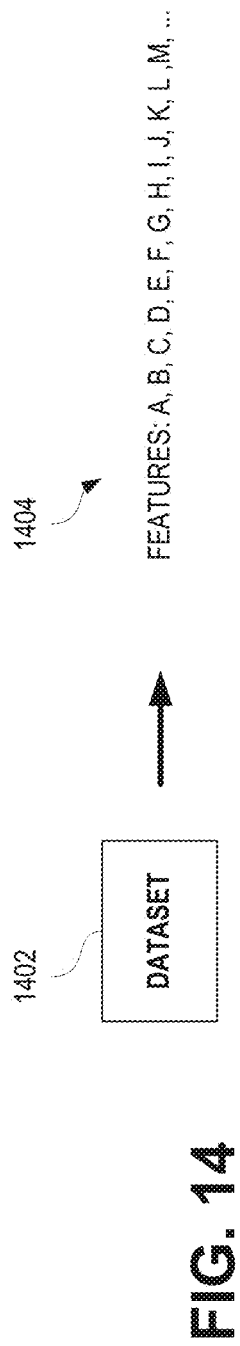
FIG. 14 is a schematic diagram depicting an example of a dataset that can be processed using the techniques described herein according to certain aspects of the present disclosure.
FIG. 15 is an example of a visual interpretation of a chart correlating weighting coefficients to data features according to certain aspects of the present disclosure.

FIG. 14 is a schematic diagram depicting an example of a dataset 1402 that can be processed using the techniques described herein according to certain aspects of the present disclosure. The dataset 1402 can contain data that tracks a plurality of features 1404, as described above. For example, a dataset 1402 containing a plurality of biological test results can contain a plurality of features 1404 that may relate to aspects being tested (e.g., absence or presence of a particular DNA sequence).

FIG. 15 is an example of a visual interpretation of a chart 1500 correlating weighting coefficients 1504, 1506 to features 1502 according to certain aspects of the present disclosure. Features 1502 shown at the top of the chart can correlate with features of a dataset, such as features 1404 of dataset 1402 of FIG. 14. The $w_k$ weighting coefficients row 1504 can correlate to the weighting coefficients w of Equation 1, above, as computed for a $k^{th}$ predefined value of the regularization parameter (e.g., $\lambda_k$). The $w_{k+1}$ weighting coefficients row 1506 can correlate to the weighting coefficients w of Equation 1, above, as computed for a $(k+1)^{th}$ predefined value of the regularization parameter (e.g., $\lambda_{k+1}$). The chart 1500 shows two rows of weighting coefficients 1504, 1506, however many more rows may exist, one for each predefined values of the regularization parameter.

The chart 1500 demonstrates that for certain features 1502, the weighting coefficients 1504, 1506 will be zero, and thus those features do not affect the outcome of the solution of the support vector machine. The systems and techniques described herein are used to identify those features 1502 that will have a $w_{k+1}$ weighting coefficient 1506 of zero for a $(k+1)^{th}$ predefined value of the regularization parameter (e.g., $\lambda_{k+1}$). Such features having a zero coefficient can be known as inactive features 1508. The inactive features 1508 of FIG. 15 are shown with a dotted circle around them.

The systems and techniques described herein can be used to identify those inactive features 1508 associated with a $(k+1)^{th}$ predefined value of the regularization parameter before computing a solution for the support vector machine for the $(k+1)^{th}$ predefined value of the regularization parameter. Thus, when it comes time to compute the solution for the support vector machine for the $(k+1)^{th}$ predefined value of the regularization parameter, the computation can be performed with fewer features, and thus be performed faster and with less computational cost. The more sparse and high-featured the dataset, the more time savings and/or computational cost savings can be achieved.

Figure 16:
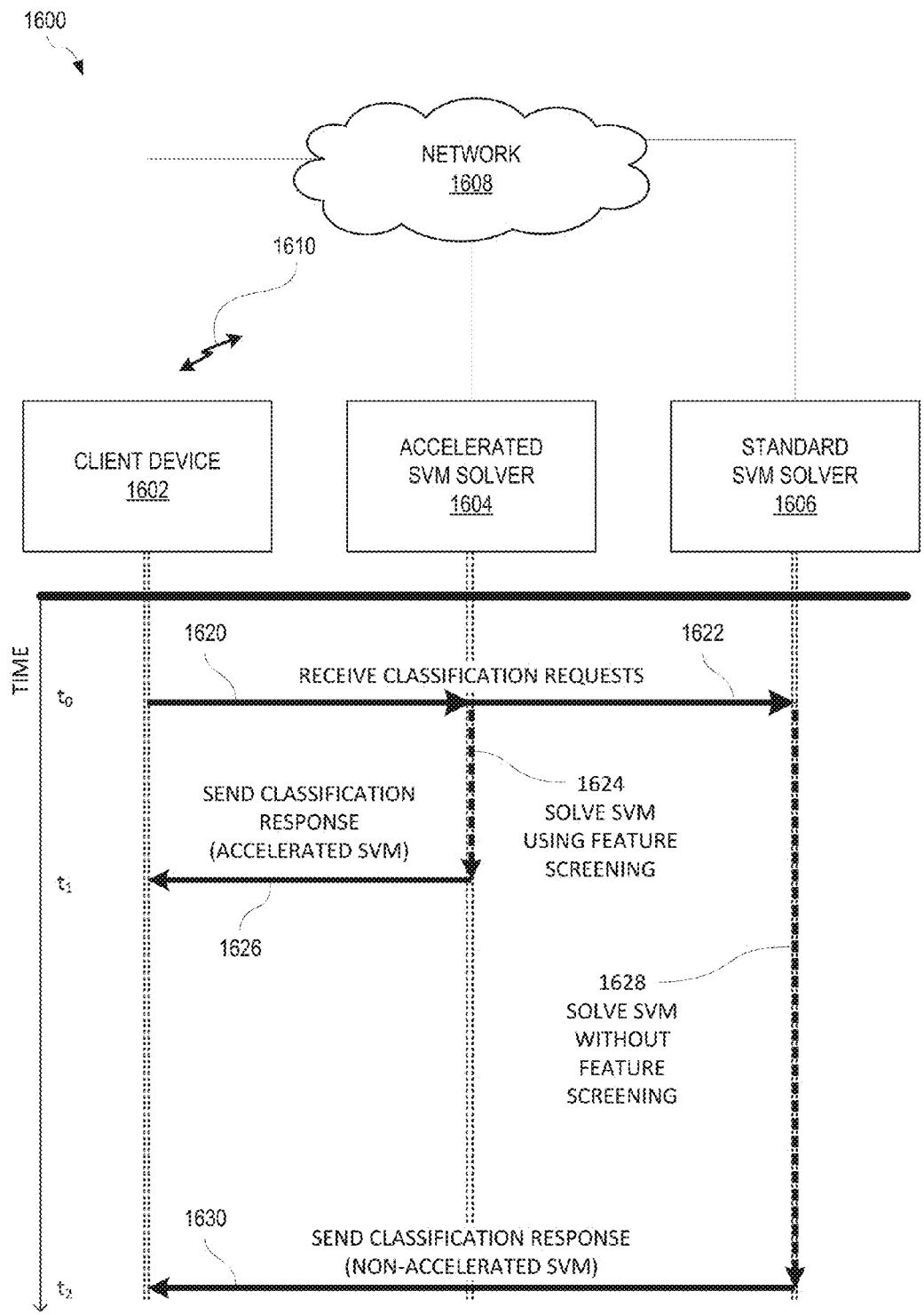
FIG. 16 is a combination schematic diagram and time chart depicting an example system using the acceleration techniques described herein according to certain aspects of the present disclosure.

FIG. 16 is a combination schematic diagram and time chart depicting an example system 1600 using the acceleration techniques described herein according to certain aspects of the present disclosure. The top portion of the figure is a schematic diagram of the system 1600 and the bottom portion of the figure is a time chart depicting a usage of the system 1600.

The system 1600 can include a client device 1602 and an accelerated SPSVM solver 1604. For comparison purposes, a standard SPSVM solver 1606 is shown, but the standard SPSVM solver 1606 need not be part of system 1600. The SPSVM solvers 1604, 1606 can be coupled to the client device 1602 through a network 1608, such as the Internet or a local area network. Client device 1602 can send and receive communications 1610 to one of the SPSVM solvers 1604, 1606 through the network 1608. The classification requests and responses described below can be transmitted as communications 1610. In some cases, however, the SPSVM solvers 1604, 1606 can be embodied as a module or programming that is part of the client device 1602 itself.

The client device 1602 is shown as having transmitted a classification request to each of the SPSVM solvers 1604. The accelerated SPSVM solver 1604 receives classification request 1620 simultaneously as when the standard SPSVM solver 1606 receives the classification request 1622. A classification request can be any request to make use of the SPSVM solver. A classification request can include an indication of a dataset, such as a dataset itself or instructions to otherwise access a dataset accessible to the SPSVM solver 1604, 1606 (e.g., via a network). The dataset being processed in FIG. 16 can be a high-feature dataset. The accelerated SPSVM solver 1604 and standard SPSVM solver 1606 can begin processing the requests at the same time, $t_0$.

At 1624, the accelerated SPSVM solver 1604 solves the SPSVM using the feature screening techniques disclosed herein. Due to the computational savings associated with feature screening (e.g., identification and exclusion of inactive features during model selection), the accelerated SPSVM solver 1604 calculates the solution quickly. At time $t_1$, the accelerated SPSVM solver 1604 sends a classification response to the client device 1602. The classification response can contain information associated with the solution to the SPSVM. For example, a classification response can be an indication as to how a particular record would be classified. The classification response can simply be the solution to the SPSVM (e.g., a solution which can later be used to classify data).

At 1628, the standard SPSVM solver 1606 solves the SPSVM without using the feature screening techniques disclosed herein. Without the computational savings afforded by features screening, the standard SPSVM solver 1606 solves the SPSVM slowly. At time $t_2$, the standard SPSVM solver 1606 sends a classification response to the client device 1602.

The time difference between $t_2$ and $t_1$ shows a clear time-based performance increase associated with the use of feature screening. For example, even small time-based performance increases can result in huge savings when the accelerated SPSVM solver 1604 is used to classify whether or not to make a computer-based trade. Other time-sensitive industries can greatly benefit from faster SPSVM solvers. Additionally, less computational power used can increase the lifespan of physical devices (e.g., a sever) embodying the accelerated SPSVM solver 1604, can reduce the amount of electricity used, can reduce the amount of cooling necessary to maintain the physical devices embodying the accelerated SPSVM solver 1604, and can provide other benefits.

While this disclosure may contain many specifics, these should not be construed as limitations on the scope or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session. Some systems may be of other types, designs and configurations.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a system comprising one or more data processors and a non-transitory computer-readable storage medium containing instructions which, when executed on the one or more data processors, cause the one or more data processors to perform operations including: accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

Example 2 is the system of example 1, wherein the operations further include determining the initial regularization value, wherein determining the initial regularization value includes identifying one of the series of predefined values associated with one of the plurality of features.

Example 3 is the system of examples 1 or 2, wherein the sparse support vector machine model includes a dual form defined by a dual variable, and wherein identifying an inactive feature includes: determining an upper bound for an inner product of a weighted feature and the dual variable for the next regularization value; and identifying the weighted feature as an inactive feature when the upper bound is less than one.

Example 4 is the system of example 3, wherein determining the upper bound includes: determining an initial dual variable for the initial regularization value using the initial solution; constraining the dual variable for the next regularization valued to a convex set using the initial dual variable; and determining the upper bound by calculating a maximum value of the convex set.

Example 5 is the system of examples 1-4, wherein the sparse support vector machine model is an L1 norm regularized L2 loss support vector machine model.

Example 6 is the system of examples 1-5, wherein the operations further include: receiving a classification request, wherein the classification request includes an indication of the dataset; and transmitting a classification response, wherein the classification response is based on the initial solution and the next solution.

Example 7 is the system of examples 1-6, wherein the operations further include: compiling the initial solution and the next solution into an overall solution to the sparse support vector machine model; accessing a second dataset containing data to be classified; and classifying the second dataset using the sparse support vector machine model, wherein classifying the second dataset includes applying the overall solution to the sparse support vector machine model.

Example 8 is a computer-program product tangibly embodied in a non-transitory machine-readable storage medium, including instructions configured to cause a data processing apparatus to perform operations including: accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

Example 9 is the computer-program product of example 8, wherein the operations further include determining the initial regularization value, wherein determining the initial regularization value includes identifying one of the series of predefined values associated with one of the plurality of features.

Example 10 is the computer-program product of examples 8 or 9, wherein the sparse support vector machine model includes a dual form defined by a dual variable, and wherein identifying an inactive feature includes: determining an upper bound for an inner product of a weighted feature and the dual variable for the next regularization value; and identifying the weighted feature as an inactive feature when the upper bound is less than one.

Example 11 is the computer-program product of example 10, wherein determining the upper bound includes: determining an initial dual variable for the initial regularization value using the initial solution; constraining the dual variable for the next regularization valued to a convex set using the initial dual variable; and determining the upper bound by calculating a maximum value of the convex set.

Example 12 is the computer-program product of examples 8-11, wherein the sparse support vector machine model is an L1 norm regularized L2 loss support vector machine model.

Example 13 is the computer-program product of examples 8-12, wherein the operations further include: receiving a classification request, wherein the classification request includes an indication of the dataset; and transmitting a classification response, wherein the classification response is based on the initial solution and the next solution.

Example 14 is the computer-program product of examples 8-13, wherein the operations further include: compiling the initial solution and the next solution into an overall solution to the sparse support vector machine model; accessing a second dataset containing data to be classified; and classifying the second dataset using the sparse support vector machine model, wherein classifying the second dataset includes applying the overall solution to the sparse support vector machine model.

Example 15 is a computer-implemented method, comprising: accessing a dataset comprising data tracking a plurality of features; determining a series of values for a regularization parameter of a sparse support vector machine model, the series including an initial regularization value and a next regularization value; computing an initial solution to the sparse support vector machine model for the initial regularization value; identifying, using the initial solution, inactive features of the sparse support vector machine model for the next regularization value; and computing a next solution to the sparse support vector machine model for the next regularization value, wherein computing the next solution includes excluding the inactive features.

Example 16 is the method of example 15, further comprising determining the initial regularization value, wherein determining the initial regularization value includes identifying one of the series of predefined values associated with one of the plurality of features.

Example 17 is the method of examples 15 or 16, wherein the sparse support vector machine model includes a dual form defined by a dual variable, and wherein identifying an inactive feature includes: determining an upper bound for an inner product of a weighted feature and the dual variable for the next regularization value; and identifying the weighted feature as an inactive feature when the upper bound is less than one.

Example 18 is the method of example 17, wherein determining the upper bound includes: determining an initial dual variable for the initial regularization value using the initial solution; constraining the dual variable for the next regularization valued to a convex set using the initial dual variable; and determining the upper bound by calculating a maximum value of the convex set.

Example 19 is the method of examples 15-18, wherein the sparse support vector machine model is an L1 norm regularized L2 loss support vector machine model.

Example 20 is the method of examples 15-19, further comprising: receiving a classification request, wherein the classification request includes an indication of the dataset; and transmitting a classification response, wherein the classification response is based on the initial solution and the next solution.

Example 21 is the method of examples 15-20, further comprising: compiling the initial solution and the next solution into an overall solution to the sparse support vector machine model; accessing a second dataset containing data to be classified; and classifying the second dataset using the sparse support vector machine model, wherein classifying the second dataset includes applying the overall solution to the sparse support vector machine model.

What is claimed is:

1. A system, comprising:
one or more data processors; and
a non-transitory computer-readable storage medium containing instructions which, when executed on the one or more data processors, cause the one or more data processors to perform operations including:
accessing a dataset comprising data tracking a plurality of features;
determining a series of values for a regularization parameter of a sparse support vector machine model, the series including an initial regularization value and a next regularization value, the sparse support vector machine model including a dual form defined by a dual variable;
computing an initial solution to the sparse support vector machine model for the initial regularization value;
identifying, using the initial solution, inactive features of the sparse support vector machine model for the next regularization value, wherein identifying an inactive feature includes determining an upper bound for an inner product of a weighted feature and the dual variable for the next regularization value and identifying the weighted feature as an inactive feature when the upper bound is less than one; and
computing a next solution to the sparse support vector machine model for the next regularization value, wherein computing the next solution includes excluding the inactive features.

2. The system of claim 1, wherein the operations further include determining the initial regularization value, wherein determining the initial regularization value includes identifying one of a series of predefined values associated with one of the plurality of features.

3. The system of claim 1, wherein determining the upper bound includes:
determining an initial dual variable for the initial regularization value using the initial solution;
constraining the dual variable for the next regularization value to a convex set using the initial dual variable; and
determining the upper bound by calculating a maximum value of the convex set.

4. The system of claim 1, wherein the sparse support vector machine model is an L1 norm regularized L2 loss support vector machine model.

5. The system of claim 1, wherein the operations further include:
receiving a classification request, wherein the classification request includes an indication of the dataset; and
transmitting a classification response, wherein the classification response is based on the initial solution and the next solution.

6. The system of claim 1, wherein the operations further include:
compiling the initial solution and the next solution into an overall solution to the sparse support vector machine model;
accessing a second dataset containing data to be classified; and
classifying the second dataset using the sparse support vector machine model, wherein classifying the second dataset includes applying the overall solution to the sparse support vector machine model.

7. A computer-program product tangibly embodied in a non-transitory machine-readable storage medium, including instructions configured to cause a data processing apparatus to perform operations including:
accessing a dataset comprising data tracking a plurality of features;
determining a series of values for a regularization parameter of a sparse support vector machine model, the series including an initial regularization value and a next regularization value, the sparse support vector machine model including a dual form defined by a dual variable;
computing an initial solution to the sparse support vector machine model for the initial regularization value;
identifying, using the initial solution, inactive features of the sparse support vector machine model for the next regularization value, wherein identifying an inactive feature includes determining an upper bound for an inner product of a weighted feature and the dual variable for the next regularization value and identifying the weighted feature as an inactive feature when the upper bound is less than one; and
computing a next solution to the sparse support vector machine model for the next regularization value, wherein computing the next solution includes excluding the inactive features.

8. The computer-program product of claim 7, wherein the operations further include determining the initial regularization value, wherein determining the initial regularization value includes identifying one of a series of predefined values associated with one of the plurality of features.

9. The computer-program product of claim 7, wherein determining the upper bound includes:
determining an initial dual variable for the initial regularization value using the initial solution;
constraining the dual variable for the next regularization value to a convex set using the initial dual variable; and
determining the upper bound by calculating a maximum value of the convex set.

10. The computer-program product of claim 7, wherein the sparse support vector machine model is an L1 norm regularized L2 loss support vector machine model.

11. The computer-program product of claim 7, wherein the operations further include:
receiving a classification request, wherein the classification request includes an indication of the dataset; and
transmitting a classification response, wherein the classification response is based on the initial solution and the next solution.

12. The computer-program product of claim 7, wherein the operations further include:

compiling the initial solution and the next solution into an overall solution to the sparse support vector machine model;

accessing a second dataset containing data to be classified; and classifying the second dataset using the sparse support vector machine model, wherein classifying the second dataset includes applying the overall solution to the sparse support vector machine model.

13. A computer-implemented method, comprising:

accessing a dataset comprising data tracking a plurality of features;

determining a series of values for a regularization parameter of a sparse support vector machine model, the series including an initial regularization value and a next regularization value, the sparse support vector machine model including a dual form defined by a dual variable;

computing an initial solution to the sparse support vector machine model for the initial regularization value;

identifying, using the initial solution, inactive features of the sparse support vector machine model for the next regularization value, wherein identifying an inactive feature includes determining an upper bound for an inner product of a weighted feature and the dual variable for the next regularization value and identifying the weighted feature as an inactive feature when the upper bound is less than one; and computing a next solution to the sparse support vector machine model for the next regularization value, wherein computing the next solution includes excluding the inactive features.

14. The method of claim 13, further comprising determining the initial regularization value, wherein determining the initial regularization value includes identifying one of a series of predefined values associated with one of the plurality of features.

15. The method of claim 13, wherein determining the upper bound includes:

determining an initial dual variable for the initial regularization value using the initial solution;

constraining the dual variable for the next regularization value to a convex set using the initial dual variable; and determining the upper bound by calculating a maximum value of the convex set.

16. The method of claim 13, wherein the sparse support vector machine model is an L1 norm regularized L2 loss support vector machine model.

17. The method of claim 13, further comprising:

receiving a classification request, wherein the classification request includes an indication of the dataset; and transmitting a classification response, wherein the classification response is based on the initial solution and the next solution.

18. The method of claim 13, further comprising:

compiling the initial solution and the next solution into an overall solution to the sparse support vector machine model;

accessing a second dataset containing data to be classified; and classifying the second dataset using the sparse support vector machine model, wherein classifying the second dataset includes applying the overall solution to the sparse support vector machine model.

* * * * *